US012748028B2

(12) United States Patent
Murarka et al.

(10) Patent No.: US 12,748,028 B2
(45) Date of Patent: Sep. 29, 2026

(54) APPARATUS AND METHOD FOR MEASURING VISCOSITY OR ONE OR MORE RHEOLOGICAL PROPERTIES OF FLUIDS

(71) Applicant: Chintan Dave, Singapore (SG)

(72) Inventors: Apoorva Murarka, Cambridge, MA (US); Chintan Dave, Singapore (SG)

(73) Assignee: Chintan Dave, Singapore (SG)

( * ) Notice: Subject to any disclaimer, the term of this patent is extended or adjusted under 35 U.S.C. 154(b) by 109 days.

(21) Appl. No.: 18/487,208

(22) Filed: Oct. 16, 2023

(65) Prior Publication Data

US 2024/0035946 A1 Feb. 1, 2024

Related U.S. Application Data

(63) Continuation of application No. PCT/SG2022/050225, filed on Apr. 17, 2022.

(30) Foreign Application Priority Data

Apr. 16, 2021 (SG) ............................ 10202103946T

(51) Int. Cl.
*G01N 11/16* (2006.01)

(52) U.S. Cl.
CPC .................................... *G01N 11/16* (2013.01)

(58) Field of Classification Search
CPC .. G01N 2009/006; G01N 9/002; G01N 11/16; G01P 15/02
USPC ....... 73/1.83, 1.86, 1.88, 54.24–54.35, 54.41
See application file for complete search history.

(56) References Cited

U.S. PATENT DOCUMENTS

| | | | |
|---|---|---|---|
| 6,250,136 B1 * | 6/2001 | Igreja | G01F 23/2965 73/54.24 |
| 2001/0011479 A1 | 8/2001 | Takeuchi et al. | |
| 2017/0160176 A1 | 6/2017 | Kanno et al. | |
| 2018/0010995 A1 | 1/2018 | Gajji et al. | |

FOREIGN PATENT DOCUMENTS

| | | | |
|---|---|---|---|
| GB | 3140605 | * | 7/1964 |
| JP | 59015838 A | * | 1/1984 |
| KR | 10-2010-0003203 | | 1/2010 |
| KR | 10-2013-0001551 | | 1/2013 |

OTHER PUBLICATIONS

WIPO, International Search Report in corresponding PCT application PCT/SG2022/050225, Jul. 15, 2022.
WIPO, Written Opinion in corresponding PCT application PCT/SG2022/050225, Jul. 15, 2022.

* cited by examiner

*Primary Examiner* — Robert R Raevis
(74) *Attorney, Agent, or Firm* — Alley IP

(57) ABSTRACT

An apparatus for measuring, viscosity or one or more rheological properties of fluids as a function of at least one signal, said apparatus comprising: at least a member with at least an Inertial Measurement Unit coupled to said member, said Inertial Measurement Unit configured to measure said at least one signal in relation to said member; and at least a motor coupled to said member in order to make said member into a vibrating member, upon actuation of said coupled motor, said member being configured to be dipped into a fluid whose viscosity or one or more rheological properties is to be measured.

22 Claims, 27 Drawing Sheets

$S_1 = \theta r_1$
$S_2 = \theta r_2$ $S_1 = \theta r_1$
$S_2 = \theta r_2$ $$S_1 = \theta r_1$$
$$S_2 = \theta r_2$$

$$S_1 = \theta r_1$$
$$S_2 = \theta r_2$$

APPARATUS AND METHOD FOR MEASURING VISCOSITY OR ONE OR MORE RHEOLOGICAL PROPERTIES OF FLUIDS

RELATED APPLICATIONS

This application claims priority under 35 U.S.C. § 120 to, and is a continuation of, co-pending International Application PCT/SG2022/050225, filed Apr. 17, 2022 and designating the US, which claims priority to SG Application 10202103946T, filed Apr. 16, 2021, such SG Application also being claimed priority to under 35 U.S.C. § 119. These SG and International applications are incorporated by reference herein in their entireties.

FIELD

This invention relates to the field of instrumentation and electronics engineering. Particularly, this invention relates to systems, methods, and apparatus concerning measurements and sensing of viscosity or one or more rheological properties of fluids.

BACKGROUND

Rheological properties of fluids relate to one of several flow characteristics of a fluid material. Typically, the term, ‘rheological property’ relates to parameters such as viscosity, thixotropic index, dispense rate, sag resistance, among others.

Firstly, it was observed that prevalent prior art mechanisms are bulky since they use large transducers that include actuators functioning in association with other sensors, reflectors etc.

There is a continuous need to miniaturize devices, without losing accuracy, with an intention of making them portable. Moreover, increase in measurement/sensing precision and accuracy are desired features, especially if it can be achieved with lower device complexity and cost.

Additionally, it was observed that prevalent prior art mechanisms necessitate feedback from the transducers and/or the sensors for maintaining constant amplitude and/or velocity of a vibrating member/element/shaft as means of calibration and/or accurate sensing. In such cases, the actuators and/or any attached vibrating members/elements/shafts are driven at the mechanical (or electro-mechanical) resonant frequencies of vibration of the system.

There is, therefore, a need to decrease complexity of sensing methodologies and mechanisms in both open-loop and closed-loop measurements of rheological properties of fluids (such as viscosity). Such technological advancements that decrease sensing/measurement complexity can, in turn, decrease associated design, manufacturing, assembly, and maintenance complexities, thereby decreasing costs and enabling portability.

Furthermore, it was observed that even with the advent of miniaturized electronics, especially micro and nano electromechanical systems (MEMS/NEMS) such as accelerometers, gyroscopes, pressure sensors, and their combinations in inertial measurement units (IMUs), their application to the field of sensing rheological properties was restricted, in that, the prior art does not disclose a method of construction of an apparatus which senses viscosity of a fluid, accurately using such miniaturized sensing and actuation systems. Prior miniaturized rheological sensing systems have been limited to microfluidic lab-on-chip demonstrations that often compromise performance, ease of use, and portability, and are therefore, largely absent from commercialized applications.

Still further, it was observed that even with the advent of miniaturized electronics, their application to the field of sensing rheological properties were restricted, in that, the prior art does not disclose a method of signal processing for sensing one or more rheological properties (e.g. viscosity) of a fluid, accurately, especially using inputs and outputs of these miniaturized sensors and actuators It was also observed, in prior art documents, that because an actual sensor (or a part of a sensing mechanism) has to be deployed on a vibrating member, the size/mass/weight of the sensing mechanism places physical (sizing, mechanical) constraints on this vibrating member. Sensing mechanisms described in prior art (bulky combinations of piezoelectric elements and or electric coils and magnetic systems) are also difficult to miniaturize to microscale dimensions. There is, therefore, an advantage to using a miniaturized sensing mechanism (especially a MEMS/NEMS sensor system) because it obviates or significantly minimizes the effect of the sensor system’s physical dimensions and mass on the design and performance of the viscosity/rheological property measurement device. Additionally, using a miniaturized sensing system reduces the complexity of the overall system design, such as enabling greater flexibility in the placement of the actuation and sensing systems to maximize one or more overall device performance metrics such as sensitivity, dynamic range, etc.

For example, it was observed, in prior art documents, that the weight of the vibrating member which supports the sensing mechanism was correlated to the weight of the sensing mechanism itself in order to produce a discernible signal that can be used for sensing.

There is, therefore, a need to disconnect this dependence/correlation.

SUMMARY

An object of the invention is to provide an apparatus and method which senses viscosity and/or at least a rheological property, of a fluid by making the apparatus light, portable, and accurate.

Another object of the invention is to provide an apparatus and method which senses viscosity and/or at least a rheological property, of a fluid by reducing time taken to measure a rheological property of a fluid.

Still another object of the invention is to provide an apparatus and method which senses viscosity and/or at least a rheological property, of a fluid by reducing complexity in its design/construction.

An additional object of the invention is to provide an apparatus and method which senses viscosity and/or at least a rheological property, of a fluid by eliminating the need for using complex closed-loop feedback mechanisms and associated sensing and drive electronics to maintain a constant vibration displacement and/or velocity amplitude in a fluid (at resonance frequency or any other drive frequency).

According to this invention, there is provided an apparatus for measuring, viscosity or one or more rheological properties of fluids as a function of at least one signal, said apparatus comprises:

- at least a member with at least an Inertial Measurement Unit coupled to said member, said Inertial Measurement Unit configured to measure said at least one signal in relation to said member; and
- at least a motor coupled to said member in order to make said member into a vibrating member, upon actuation of said coupled motor, said member being configured to be dipped into a fluid whose viscosity or one or more rheological properties is to be measured.

In at least an embodiment, said member is selected from a group of members consisting of a rod member, a cylindrical object member, a shim member, an oblong member, an ellipsoidal member, a cuboidal member, and a stiff strip member.

In at least an embodiment, said Inertial Measurement Unit comprises an accelerometer, attached to said member, said accelerometer being configured to measure acceleration, about one or more orthogonal axes.

In at least an embodiment, said Inertial Measurement Unit comprises a gyroscope, attached to said member, said gyroscope being configured to measure angular velocity, and/or angular displacement, and/or orientation (attitude), about one or more orthogonal axes.

In at least an embodiment, said Inertial Measurement Unit comprises at least an element selected from a group of elements consisting of MEMS gyroscopes, NEMS gyroscopes, angular rate sensors, rate integrating gyroscopes, angular rate sensors based on the Coriolis effect, accelerometers, magnetometers, MEMS accelerometers, NEMS accelerometers, MEMS magnetometers, pressure sensors, barometers, and temperature sensors.

In at least an embodiment, said Inertial Measurement Unit being located at a point, on said member, said point selected from a locus of points defined to be linearly increasing from an operative distal end portion on said member, said operative distal end portion being configured to be dipped in fluid, said locus of points being correlative to desired sensitivity, in that, a relatively closer point, from said operative distal end portion, providing relatively higher sensitivity, and a relatively farther point, from said operative distal end portion, providing relatively lesser sensitivity.

In at least an embodiment, said apparatus comprises one or more Inertial Measurement Units on said member, each of said Inertial Measurement Units being spaced apart from each other and being positioned in terms of their distance from an operative distal end portion of said member, said distal end portion being configured to be dipped into a fluid.

In at least an embodiment, said Inertial Measurement Unit abuts said member.

In at least an embodiment, said motor abuts said member.

In at least an embodiment, said motor having an output, with amplitude and/or frequency of said output, being controlled by varying voltage or current applied to said motor.

In at least an embodiment, said member comprises one or more temperature sensors.

In at least an embodiment, said apparatus comprises fins, attached to said member, said fins projecting in an operatively downward manner, said fins being configured to be vibrating or being configured to be static.

In at least an embodiment, said apparatus comprises fins, attached to said member, said fins projecting in an operatively downward manner, said fins being configured to be vibrating or being configured to be static, characterized in that, one or more vibrating fins being configured to vibrate with one or more corresponding vibrating frequencies, said one or more corresponding frequencies being same or distinct with respect to each other.

In at least an embodiment, said apparatus comprises fins, said fins projecting in an operatively downward manner, said fins being configured to be vibrating or being configured to be static, characterized in that, said vibrating fins being attached to said member, said static fins being attached to an outer housing configured to cover a portion of said member, one or more of said static fins being located on one or more sets of locus of points equidistant from one or more of said vibrating fins, thereby defining a first distance of a first static fin from an operative central vibrating fin and a second distance of a second static fin from said operative central vibrating fin, said first distance being equal to said second distance in order to establish an equal shear rate, in said fluid, on either side of said vibrating fin.

In at least an embodiment, said apparatus comprises fins, said fins projecting in an operatively downward manner, said fins being configured to be vibrating or being configured to be static, characterized in that, said vibrating fins being attached to said member, said static fins being attached to an outer housing configured to cover a portion of said member, one or more of said static fins being located on one or more sets of locus of points equidistant from one or more of said vibrating fins, thereby defining a first distance of a first static fin from an operative central vibrating fin and a second distance of a second static fin from said operative central vibrating fin, said first distance being not equal to said second distance in order to establish two different shear rates, in said fluid, on either side of said vibrating fin.

In at least an embodiment, said apparatus comprises fins, attached to said member, said fins projecting in an operatively downward manner, co-axially, laterally, or radially with respect to said member, said fins being configured to be vibrating or being configured to be static.

In at least an embodiment, said apparatus comprises:

fins projecting in an operatively downward manner, said fins being configured to be vibrating or being configured to be static, said vibrating fins being attached to said member, said static fins being attached to an outer housing configured to cover a portion of said member; and one or more static fins, located laterally, on either side of said fins such that one or more of said static fins have their largest face along a plane which is either parallel to, or within 45 degrees of angular displacement, with respect to, the plane corresponding to the largest face of a medially located vibrating fin, in that, a first distance, defined between a first lateral static fin and a medially located vibrating fin, being fixed or variable to a second distance, defined between a second lateral static fin and said medially located vibrating fin.

In at least an embodiment, said apparatus comprises fins attached to, said member, said fins comprises one or more temperature sensors.

In at least an embodiment, said apparatus comprises:

fins projecting in an operatively downward manner, said fins being configured to be vibrating or being configured to be static, said vibrating fins being attached to said member, said static fins being attached to an outer housing configured to cover a portion of said member; and one or more static fins, located laterally, on either side of said fins such that one or more of said static fins have their largest face along a plane which is either parallel to, or within 45 degrees of angular displacement with respect to, the plane corresponding to the largest face of a medially located vibrating fin, in that, a first distance, defined between a first lateral static fin and a medially located vibrating fin, being fixed or variable to a second distance, defined between a second lateral static fin and said medially located vibrating fin, said static fins comprises one or more temperature sensors.

In at least an embodiment, said apparatus comprises:

fins, attached to said member, said fins projecting in an operatively downward manner, said fins, optionally, comprises one or more temperature sensors, said fins being configured to be vibrating or being configured to be static; and a first collar, ensconcing said member, allowing for attaching of said fins to said member.

In at least an embodiment, said apparatus comprises:

fins projecting in an operatively downward manner, said fins, optionally, comprises one or more temperature sensors, said fins being configured to be vibrating or being configured to be static; and one or more static fins, located laterally, on either side of said fins such that one or more of said static fins have their largest face along a plane which is either parallel to, or within 45 degrees of angular displacement, with respect to the plane corresponding to the largest face of a medially located vibrating fin, in that, a first distance, defined between a first lateral static fin and a medially located vibrating fin, being fixed or variable to a second distance, defined between a second lateral static fin and said medially located vibrating fin, said static fins comprises one or more temperature sensors; and a first collar, ensconcing said member, allowing for attaching of said fins to said member; and a second collar, ensconcing an outer housing configured to cover a portion of said member, allowing for variably locating said static fins around said medially located vibrating fins.

According to this invention, there is provided a method, for measuring viscosity or one or more rheological properties of fluids as a function of one or more signals, said method comprises:

vibrating at least a member, with at least a motor, coupled to said member, said member being configured to be dipped into a fluid whose viscosity or one or more rheological properties is to be measured;

transducing motion of said fluid-dipped vibrating member, using at least an Inertial Measurement Unit, coupled to said member, into one or more signals, about one or more orthogonal axes of a sensor of said Inertial Measurement Unit; and determining viscosity or one or more rheological properties of said fluid as a function of said one or more signals.

In at least an embodiment, said one or more signals is selected from a group of signals consisting of:

a first signal correlative to amplitude of vibration, of said vibrating member, said vibration being measured about one or more orthogonal axes of a sensor of said Inertial Measurement Unit;

a second signal correlative to frequency of vibration, of said vibrating member, said vibration being measured about one or more orthogonal axes of a sensor of said Inertial Measurement Unit;

a third signal correlative to change in amplitude of vibration, of said vibrating member, said vibration being measured about one or more orthogonal axes of a sensor of said Inertial Measurement Unit;

a fourth signal correlative to change in frequency of vibration, of said vibrating member, said vibration being measured about one or more orthogonal axes of a sensor of said Inertial Measurement Unit;

a fifth signal correlative to change in amplitude of acceleration, of said vibrating member, said vibration being measured about one or more orthogonal axes of one or more accelerometers of said Inertial Measurement Unit;

a sixth signal correlative to change in frequency of acceleration, of said vibrating member, said vibration being measured about one or more orthogonal axes of one or more accelerometers of said Inertial Measurement Unit;

a seventh signal correlative to change in amplitude of angular velocity, of said vibrating member, said vibration being measured about one or more orthogonal axes of one or more gyroscopes of said Inertial Measurement Unit;

an eighth signal correlative to change in frequency of angular velocity, of said vibrating member, said vibration being measured about one or more orthogonal axes of one or more gyroscopes of said Inertial Measurement Unit;

a ninth signal correlative to phase of a signal driving said motor;

a tenth signal correlative to voltage signal driving said motor;

an eleventh signal correlative to difference in phase between a signal driving said motor and said first signal;

a twelfth signal correlative to difference in phase between a signal driving said motor and said second signal;

a thirteenth signal correlative to difference in phase between a signal driving said motor and said third signal;

a fourteenth signal correlative to difference in phase between a signal driving said motor and said fourth signal;

a fifteenth signal correlative to temperature of said fluid;

a sixteenth signal correlative to pressure of said fluid;

a seventeenth signal correlative to current flowing through said motor, as measured using a current sensor or a current sensing integrated circuit or an electronic circuit;

an eighteenth signal correlative to ambient temperature;

a nineteenth signal correlative to change in frequency of one or more peaks present in a frequency-domain spectrum of a time-domain angular velocity signal, of said vibrating member, said vibration being measured about one or more orthogonal axes of one or more gyroscopes of said Inertial Measurement Unit; and a twentieth signal correlative to change in frequency of one or more peaks present in a frequency-domain spectrum of a time-domain acceleration signal, of said vibrating member, said vibration being measured about one or more orthogonal axes of one or more accelerometers of said Inertial Measurement Unit.

In at least an embodiment, said step of 'determining viscosity or one or more rheological properties' comprises the steps of:

sensing amplitude of vibration, of said vibrating member in air, along one or more orthogonal axes of a sensor of said Inertial Measurement Unit;

sensing frequency of vibration, of said vibrating member in air, along one or more orthogonal axes of a sensor of said Inertial Measurement Unit;

dipping said vibrating member into a fluid medium;

measuring change in amplitude of vibration once said vibrating member is dipped into said fluid medium to obtain a first signal;

measuring change in frequency of vibration once said vibrating member is dipped into said fluid medium to obtain a second signal;

measuring, optionally, a third signal which is a phase (or a difference in phase) between a signal driving a motor, and said first signal and/or said second signal; and using said first signal and/or said second signal, or a combination thereof, optionally, with a third signal, to compute viscosity or one or more rheological properties of said fluid medium.

In at least an embodiment, said at least one signal is that of an acceleration signal, a velocity signal, a displacement signal, an angular velocity signal, an angular acceleration signal, an angular displacement signal, and/or a combination of these signals; where the acceleration signal is measured about one or more orthogonal axes of the accelerometer, and where the angular velocity signal and/or the angular acceleration signal and/or the angular displacement signal is measured about one or more orthogonal axes of an angular rate sensor or a gyroscope or a rate-integrating gyroscope.

In at least an embodiment, said step of determining viscosity or one or more rheological properties, comprises at least a step of determining at least a shear rate of said fluid via one or more fins, projecting in an operatively downward manner, said fins being configured to be vibrating or being configured to be static, characterized in that, said vibrating fins being attached to said member, said static fins being attached to an outer housing configured to cover a portion of said member, one or more vibrating fins being configured to vibrate with one or more corresponding vibrating frequencies, said one or more corresponding frequencies being equal or distinct with respect to each other.

In at least an embodiment, said step of determining viscosity or one or more rheological properties comprises at least a step of determining at least a shear rate of said fluid via one or more fins, projecting in an operatively downward manner, said fins being configured to be vibrating or being configured to be static, characterized in that, said vibrating fins being attached to said member, said static fins being attached to an outer housing configured to cover a portion of said member, one or more of said static fins being located on one or more sets of locus of points equidistant from one or more of said vibrating fins, thereby defining a first distance of a first static fin from an operative central vibrating fin and a second distance of a second static fin from said operative central vibrating fin, said first distance being equal to said second distance in order to establish an equal shear rate, in said fluid, on either side of said vibrating fin.

In at least an embodiment, said step of determining viscosity or one or more rheological properties comprises at least a step of determining at least a shear rate of said fluid via one or more fins, said fins being configured to be vibrating or being configured to be static, characterized in that, said vibrating fins being attached to said member, said static fins being attached to an outer housing configured to cover a portion of said member, said fins being configured to be vibrating or being configured to be static, characterized in that, one or more of said static fins being located on one or more sets of locus of points equidistant from one or more of said vibrating fins, thereby defining a first distance of a first static fin from an operative central vibrating fin and a second distance of a second static fin from said operative central vibrating fin, said first distance being not equal to said second distance in order to establish two different shear rates, in said fluid, on either side of said vibrating fin.

BRIEF DESCRIPTION OF THE DRAWINGS

The invention will now be described in relation to the accompanying drawings, in which.

DETAILED DESCRIPTION

According to this invention, there is provided an apparatus and method for measuring viscosity and/or one or more rheological properties of fluids. The apparatus of this invention is configured to sense/detect viscosity and/or one or more rheological properties as a function of at least one signal (such as an amplitude signal, a frequency signal, and/or the like signal), typically, using an Inertial Measurement Unit (comprising an accelerometer, configured to sense/measure acceleration, about one or more orthogonal axes, and optionally, along with a gyroscope, configured to sense/measure angular velocity/angular displacement/angular orientation and/or attitude, about one or more orthogonal axes). The rheological and/or physical property of a fluid sensed or measured by the apparatus can also include its thixotropic index, dispense rate, sag resistance, viscosity, static viscosity, dynamic viscosity, kinematic viscosity, compressibility, volume elasticity, density, temperature, or a combination thereof.

Figure 1:
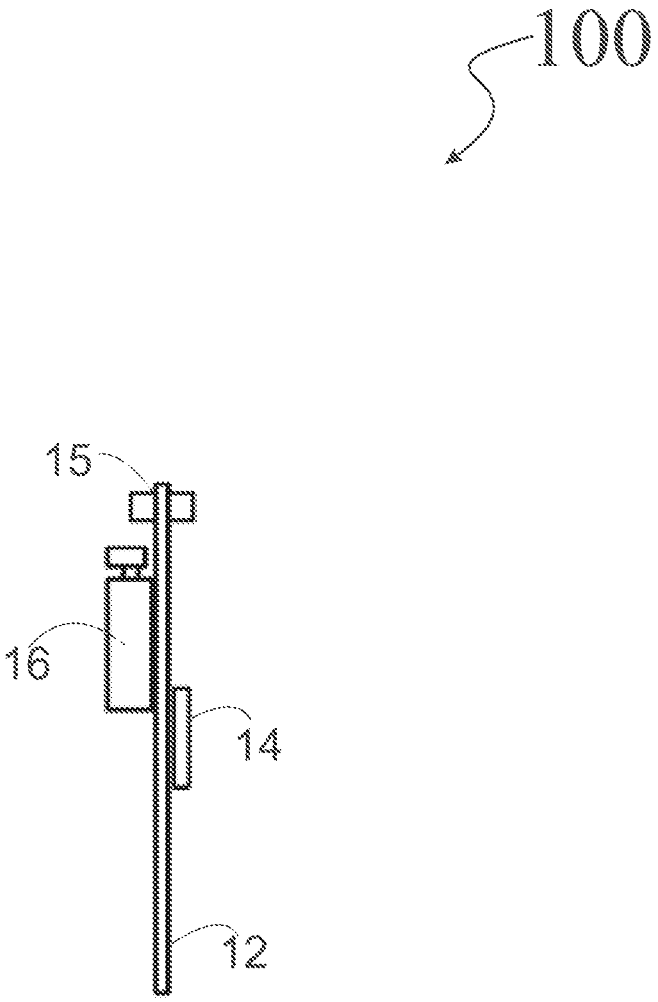
FIG. 1 illustrates one embodiment, of the apparatus, of this invention.

FIG. 1 illustrates one embodiment, of the apparatus, of this invention.

In at least an embodiment, the apparatus (100) comprises a member (12) with an Inertial Measurement Unit (14) coupled to the member (12). A motor (16) is also coupled to this member (12) in order to make the member (12) a vibrating member, the vibration being imparted, to the member (12), by the motor (16). This member (12) is configured to be dipped into a fluid whose viscosity and/or one or more rheological properties are to be measured/sensed/recorded. It is generally understood that the motor is an electrically driven motor or an electric motor. In one or more embodiments, the apparatus (100) comprises an anchor, a clamp, or a point at which the member is held by hand (15).

In at least an embodiment, the member (12) is selected from a group of members consisting of a rod member, a cylindrical object member, a shim member, an oblong member, an ellipsoidal member, a cuboidal member, and a stiff strip member.

In at least an embodiment, the Inertial Measurement Unit (14, 14*a*, 14*b*) comprises an accelerometer, configured to sense/measure acceleration, about one or more orthogonal axes, optionally along with a gyroscope, configured to sense/measure angular velocity/angular displacement/angular orientation and/or attitude, about one or more orthogonal axes. In some embodiments, an accelerometer is attached to the vibrating member. In some embodiments, a gyroscope is attached to the vibrating member. In some embodiments, the IMU comprises one or more of MEMS/NEMS gyroscopes (angular rate sensors and/or a rate integrating gyroscope), accelerometers, magnetometers, pressure sensors, barometers, and temperature sensors, on a single die or on multiple dies integrated with application-specific integrated circuits (ASICs) in a single package and/or housing.

In at least one embodiment the motor (16) is a motor selected from a group of motors consisting of a vibration motor, an eccentric rotating mass vibration motor, a brushless direct current motor, a coin motor, a brushed eccentric rotating mass vibration motor, a brushless direct current eccentric rotating mass vibration motor, and a linear resonant actuator. In an alternative embodiment, the actuator or the motor (16) can be replaced with a piezoelectric element that strains or flexes or vibrates when a voltage or a time-varying voltage is applied to it.

Figure 2:
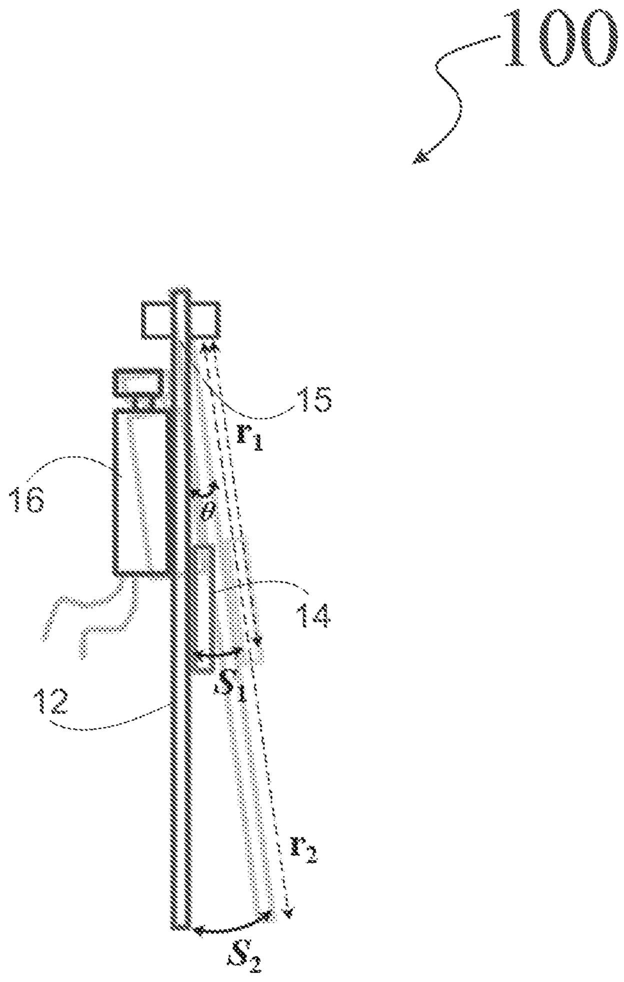
FIG. 2 illustrates the apparatus, of this invention, in its vibrating stance, having a single IMU.

FIG. 2 illustrates the apparatus, of this invention, in its vibrating stance, having a single IMU.

FIG. 2 shows Arc length, $S_1$, travelled by the member (12), at the position r 1 along its length. $S_1=r_1\cdot\theta$, where $r_1$ is the effective distance between the inertial measurement unit (IMU) and/or accelerometer/gyroscope/sensor and the member's anchor/clamp (15). θ is the angle traveled by the vibrating member (12) at the member anchor point/axis, in a given duration (or period of time or time interval).

FIG. 2 shows Arc length, $S_2$, travelled by the distal end portion, of the member (12). $S_2=r_2\cdot\theta$, where $r_2$ is the effective distance between distal end portion, of the member (12), and the member's anchor/clamp (15). θ is the angle traveled by the vibrating member at the member anchor point/axis, in a given duration (or period of time or time interval).

Figure 3:
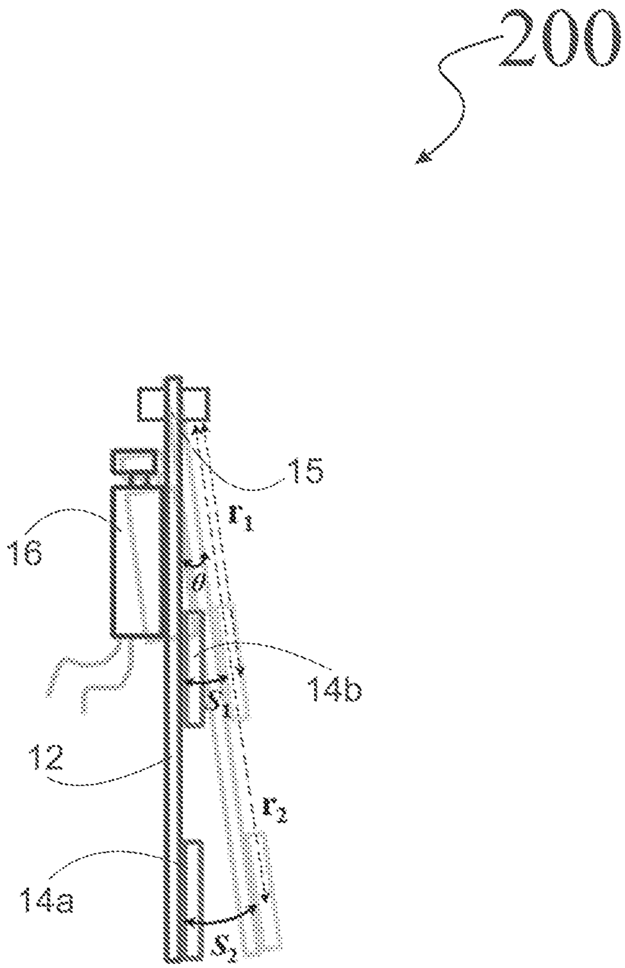
FIG. 3 illustrates another embodiment of the apparatus of this invention with two IMUs.

FIG. 3 illustrates another embodiment of the apparatus of this invention with two IMUs.

Figure 4:
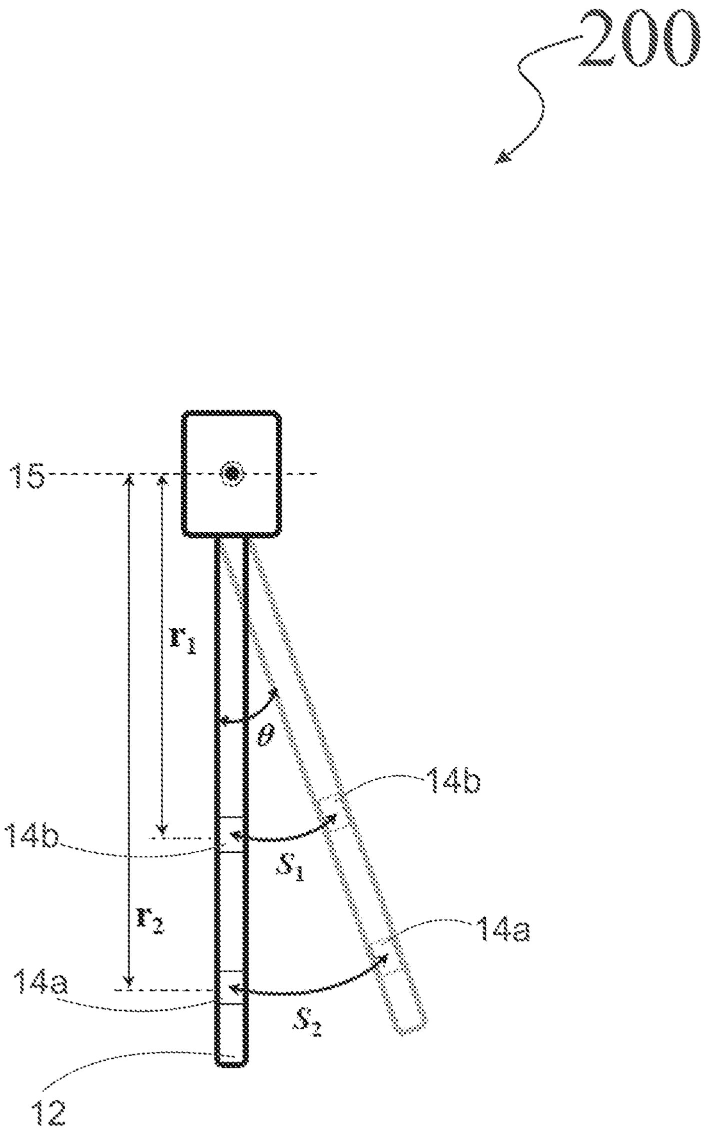
FIG. 4 illustrates an equivalent abstract schematic of another embodiment of the apparatus of FIG. 3.

FIG. 4 illustrates an equivalent abstract schematic of another embodiment of the apparatus of FIG. 3.

In an alternative embodiment, the IMU/accelerometer/gyroscope/sensor could be placed/positioned at an arbitrary effective distance, $r_2$, from the member anchor point/axis, such that the arc length, $S_2$, travelled by the member in a given duration (or period of time or time interval) at the point on the member is given by $S_2=r_2\cdot\theta$. In yet another embodiment, the position of the IMU/accelerometer/gyroscope/sensor along the member, indicated by the effective distance, $r_1$, or $r_2$, could be varied to increase or decrease the sensitivity of the measurement apparatus, or vary the measured/obtained signal strength or one or more measured/obtained signal parameters such as the signal amplitude, the signal range, and/or the signal-to-noise ratio (SNR). For example, to increase the amplitude of the signal obtained from the IMU accelerometer (14) or a standalone accelerometer (or acceleration sensor), for a given member vibration frequency or a given motor actuation voltage (or current), the IMU accelerometer or the standalone accelerometer (or acceleration sensor) that is placed/positioned, on the member (12), further away from the member anchor point (15) (or member pivot axis or member clamp) will output a larger signal amplitude than one that is placed closer to the anchor point, as indicated by the effective distances $r_2$ and $r_1$, respectively, in FIG. 2, FIG. 3, and FIG. 4.

In yet another embodiment (as shown in FIG. 3, with a simplified, equivalent schematic shown in FIG. 4), one or more IMUs/accelerometers/gyroscopes/sensors (14*a*, 14*b*) could be positioned/coupled along/to the member (12) at effective distances, $r_1$ and $r_2$, from the member anchor point/axis (15). In one such embodiment, the second set of inertial sensors (IMUs/accelerometers/gyroscopes and temperature sensors), positioned at an effective distance $r_2$, could be positioned on a portion of the member (or the apparatus) (12) that is dipped into the fluid during the viscosity and/or rheology measurement. In yet another such embodiment, the second set of inertial sensors (IMUs/accelerometers/gyroscopes and temperature sensors) could be positioned at an effective distance $r_2$, could be positioned on the fin/s or the plate/s that are attached to the member (12) and that are dipped into the fluid during the viscosity and/or rheology property measurement.

In some embodiments, the Inertial Measurement Unit (14) comprises an accelerometer to measure variation(s) in arc length w.r.t time, s(t), with viscosity, η, variations of different fluids. Alternatively, the change in the amplitude of the acceleration (a) waveform output, due to immersion of the vibrating member (12) in a fluid of differing viscosity, is proportional to the change in the viscosity between the two media (for example, fluid and air), and can be used to calculate the unknown viscosity of the fluid, given the known viscosity of air (or another fluid with a known/calibrated viscosity or associated rheological parameter) at the known/measured temperature and pressure, that is, $\Delta a \propto \Delta\eta = \eta_{fluid} - \eta_{air}$.

In some embodiments, the Inertial Measurement Unit (14) comprises a gyroscope/angular rate sensor to measure θ(t) variation with viscosity (η) (or an associated rheological parameter) variations of different fluids. Because the arc travelled (s in FIG. 3) is different at IMU 2 position (14*b*) versus IMU 1 position (14*a*), linear velocity at position 1 is less than that at 2, resulting in different viscous damping forces at the two accelerometers/IMUs, thereby enabling simultaneous measurement of viscosity (or associated rheological parameters) at different drag rates (if needed). The angular velocity $$\omega = \frac{d\theta}{dt}$$

measured by the gyroscopes at both positions should be equal or very close in value to each other to further corroborate accelerometer-aided measurements of viscosity (or associated rheological parameters). This viscosity value can then replace or supplement the kinematic viscosity (ratio of the viscosity to the density of the fluid) value that, for example, Zahn/Ford cup users currently obtain.

Once the member (12) vibrates, the inertial measurement unit (14) transduces motion of the vibrating member into an electrical signal by using its sensors to detect at least a signal correlative to (change in) amplitude of vibration and to detect at least a signal correlative to (change in) frequency of vibration. In a fluid, once a vibrating member is dipped, its vibrations will dampen—thus causing change in the frequency of vibration and the amplitude of vibration; this dampening (or change) signals are sensed and used to determine viscosity (or associated rheological parameters) of the fluid in which the vibrating member is placed; this viscosity value(s) (or associated rheological parameters) being a function of one of the signals.

In at least an embodiment, a first signal is correlative to amplitude of vibration, of said vibrating member, said vibration being measured about one or more orthogonal axes of a sensor of said Inertial Measurement Unit.

In at least an embodiment, a second signal is correlative to frequency of vibration, of said vibrating member, said vibration being measured about one or more orthogonal axes of a sensor of said Inertial Measurement Unit.

In at least an embodiment, a third signal is correlative to change in amplitude of vibration, of said vibrating member, said vibration being measured about one or more orthogonal axes of a sensor of said Inertial Measurement Unit.

In at least an embodiment, a fourth signal is correlative to change in frequency of vibration, of said vibrating member, said vibration being measured about one or more orthogonal axes of a sensor of said Inertial Measurement Unit.

In at least an embodiment, a fifth signal is correlative to change in amplitude of acceleration, of said vibrating member, said vibration being measured about one or more orthogonal axes of one or more accelerometers of said Inertial Measurement Unit.

In at least an embodiment, a sixth signal is correlative to change in frequency of acceleration, of said vibrating member, said vibration being measured about one or more orthogonal axes of one or more accelerometers of said Inertial Measurement Unit.

In at least an embodiment, a seventh signal is correlative to change in amplitude of angular velocity, of said vibrating member, said vibration being measured about one or more orthogonal axes of one or more gyroscopes of said Inertial Measurement Unit.

In at least an embodiment, an eighth signal is correlative to change in frequency of angular velocity, of said vibrating member, said vibration being measured about one or more orthogonal axes of one or more gyroscopes of said Inertial Measurement Unit.

In at least an embodiment, a ninth signal is correlative to phase of a signal driving said motor.

In at least an embodiment, a tenth signal is correlative to voltage signal driving said motor.

In at least an embodiment, an eleventh signal is correlative to difference in phase between a signal driving said motor and said first signal.

In at least an embodiment, a twelfth signal is correlative to difference in phase between a signal driving said motor and said second signal.

In at least an embodiment, a thirteenth signal is correlative to difference in phase between a signal driving said motor and said third signal.

In at least an embodiment, a fourteenth signal is correlative to difference in phase between a signal driving said motor and said fourth signal.

In at least an embodiment, a fifteenth signal is correlative to temperature of said fluid.

In at least an embodiment, a sixteenth signal is correlative to pressure of said fluid.

In at least an embodiment, a seventeenth signal is correlative to current flowing through said motor, as measured using a current sensor or a current sensing integrated circuit or an electronic circuit.

In at least an embodiment, an eighteenth signal is correlative to ambient temperature.

In at least an embodiment, a nineteenth signal is correlative to change in frequency of one or more peaks present in a frequency-domain spectrum of a time-domain angular velocity signal, of said vibrating member, said vibration being measured about one or more orthogonal axes of one or more gyroscopes of said Inertial Measurement Unit.

In at least an embodiment, a twentieth signal correlative to change in frequency of one or more peaks present in a frequency-domain spectrum of a time-domain acceleration signal, of said vibrating member, said vibration being measured about one or more orthogonal axes of one or more accelerometers of said Inertial Measurement Unit.

In a preferred embodiment, the Inertial Measurement Unit (IMU) is located at a position further away from the anchor or the clamp of the vibrating member in order to improve or optimize the sensitivity of the device. Alternatively, this corresponds to locating the Inertial Measurement Unit closer to the unclamped or the free end of the vibrating element. In some embodiments, the Inertial Measurement Unit (14) is co-axial to the member (12). In a general sense, the sensitivity or the strength of the detected signal output from the apparatus increases the further the IMU is located away from the vibrating element clamp or anchor.

In an embodiment, the motor (16) is co-axial to the member (12). In yet another embodiment, the motor abuts the vibrating element or the member.

In an embodiment, the position of the motor relative to the length of the vibrating element or member is optimized such as to maximize the acceleration and/or the angular velocity of the vibrating element (or member) at its free (vibrating) end and/or at the position of one or more of the IMUs.

In a preferred embodiment, the motor (16) is a vibration motor or an eccentric rotating mass vibration motor.

In yet another embodiment, the motor (16) has an output rotating shaft that is attached to the vibrating element or member, or is co-axial to the vibrating element or member.

In yet another embodiment, the motor (16) is a linear resonant actuator (LRA).

In yet another embodiment, the actuation mechanism comprises more than one motor and each motor can be of the same type or a combination of one or more types of motors described above.

It is to be understood that the position of the various sensors can be static or dynamic and be varied in real time or fixed prior to manufacturing in order to yield optimal signal parameters such as sensor output sensitivity and/or dynamic range.

It is to be understood that the position of one or more motors/actuators can be static or dynamic and be varied in real time or fixed prior to manufacturing in order to yield optimal signal parameters such as sensor output sensitivity and or dynamic range.

It is to be understood that the apparatus, of this invention, can be handheld or clamped with the position of the clamp anchor point being variable.

Referring to FIG. 1 and FIG. 2, of the accompanying drawings, arc length, s, travelled by the member (12) s=r·θ, where r is the effective distance between the inertial measurement unit (IMU) (14) and/or accelerometer/sensor and the member (12) and or/clamp. θ is the angle traveled by the vibrating member (12) at the member's anchor point/axis (15).

For a rigid vibrating member (12), we have $$s = r \times \theta.$$

Differentiating the equation above w.r.t time, we get $$v = r \cdot \frac{d\theta}{dt} = r \cdot \omega,$$

where v is the linear velocity sensed at each IMU position (integration w.r.t time of the accelerometer outputs) and co is the angular velocity of the member (12). The gyroscope (angular rate sensors, ARS) in the IMUs (14) should measure the same or almost similar ω at each position.

Differentiating the equation above w.r.t time again, we get $$a = r \cdot \frac{d\omega}{dt} = r \cdot \alpha,$$

where a is the linear acceleration of the vibrating member (12) sensed at each IMU position (by the accelerometers) and a is the angular acceleration of the member (12). Since the viscous drag force exerted by the fluid onto the vibrating member (12) will decrease the member's linear acceleration, the angular acceleration, a, of the member (12) will proportionally decrease (as shown in the equation above) due the higher viscosity of the medium. Moreover, since $$\alpha = \frac{d\omega}{dt} = \frac{d\left(\frac{d\theta}{dt}\right)}{dt} = \frac{d^2\theta}{dt^{2'}}$$

we can expect the gyros/ARS in the IMUs to detect the change in co due to viscosity of the fluid. That is, since $\Delta a \propto \Delta\eta$, and $$\Delta\alpha = \frac{1}{\gamma}\Delta a,$$

we have $\Delta a \propto \Delta\eta = \eta_{fluid} - \eta_{air}$ and, therefore, via integration, Δ•∝Δη and Δθ∝Δη, and this signal due to fluidic viscous drag should show up in the IMU gyro/ARS outputs as well. [Note that the ∝ symbol is used here to represent "is proportional to". Note that the Δ symbol is used to represent the change in a parameter or a quantity or a variable, with respect to another variable or set of variables, such as time, space, medium, temperature, density etc.]

In at least an embodiment, a method to detect/sense viscosity and/or one or more rheological and/or physical properties of a fluid such as its thixotropic index, dispense rate, sag resistance, viscosity, static viscosity, dynamic viscosity, kinematic viscosity, compressibility, volume elasticity, density, temperature, or a combination thereof) of a fluid is disclosed, the method comprising:

- sensing amplitude of vibration, of said vibrating member in air, along one or more orthogonal axes of a sensor of said Inertial Measurement Unit;
- sensing frequency of vibration, of said vibrating member in air, along one or more orthogonal axes of a sensor of said Inertial Measurement Unit;
- dipping said vibrating member into a fluid medium;
- measuring change in amplitude of vibration once said vibrating member is dipped into said fluid medium to obtain a first signal;

measuring change in frequency of vibration once said vibrating member is dipped into said fluid medium to obtain a second signal;

measuring a third signal which is a phase (or a difference in phase) between a signal, driving a motor, and said first signal and/or said second signal; and using said first signal and/or said second signal, or a combination thereof, optionally, with a third signal, to compute viscosity and/or one more rheological properties of said fluid medium.

In at least an embodiment, said amplitude is that of an acceleration signal, a velocity signal, a displacement signal, an angular velocity signal, an angular acceleration, and/or a combination of these signals; where the acceleration signal is an output of one or more orthogonal axes of the accelerometer, and where the angular velocity signal and/or the angular acceleration signal is an output of the one or more orthogonal axes of the angular rate sensor or the gyroscope. The amplitude can refer to that of sensed or measured displacement, velocity, and/or acceleration.

In at least an embodiment, said frequency is that of an acceleration signal, a velocity signal, a displacement signal, an angular velocity signal, an angular displacement signal, and/or a combination of these signals; where the acceleration signal is an output of one or more orthogonal axes of the accelerometer, and where the angular velocity signal and/or the angular displacement signal is an output of the one or more orthogonal axes of the angular rate sensor or the gyroscope. The amplitude can refer to that of sensed or measured displacement, velocity, and/or acceleration. The frequency can refer to that of the sensed or measured angular frequency, angular velocity and/or angular displacement.

Figure 5:
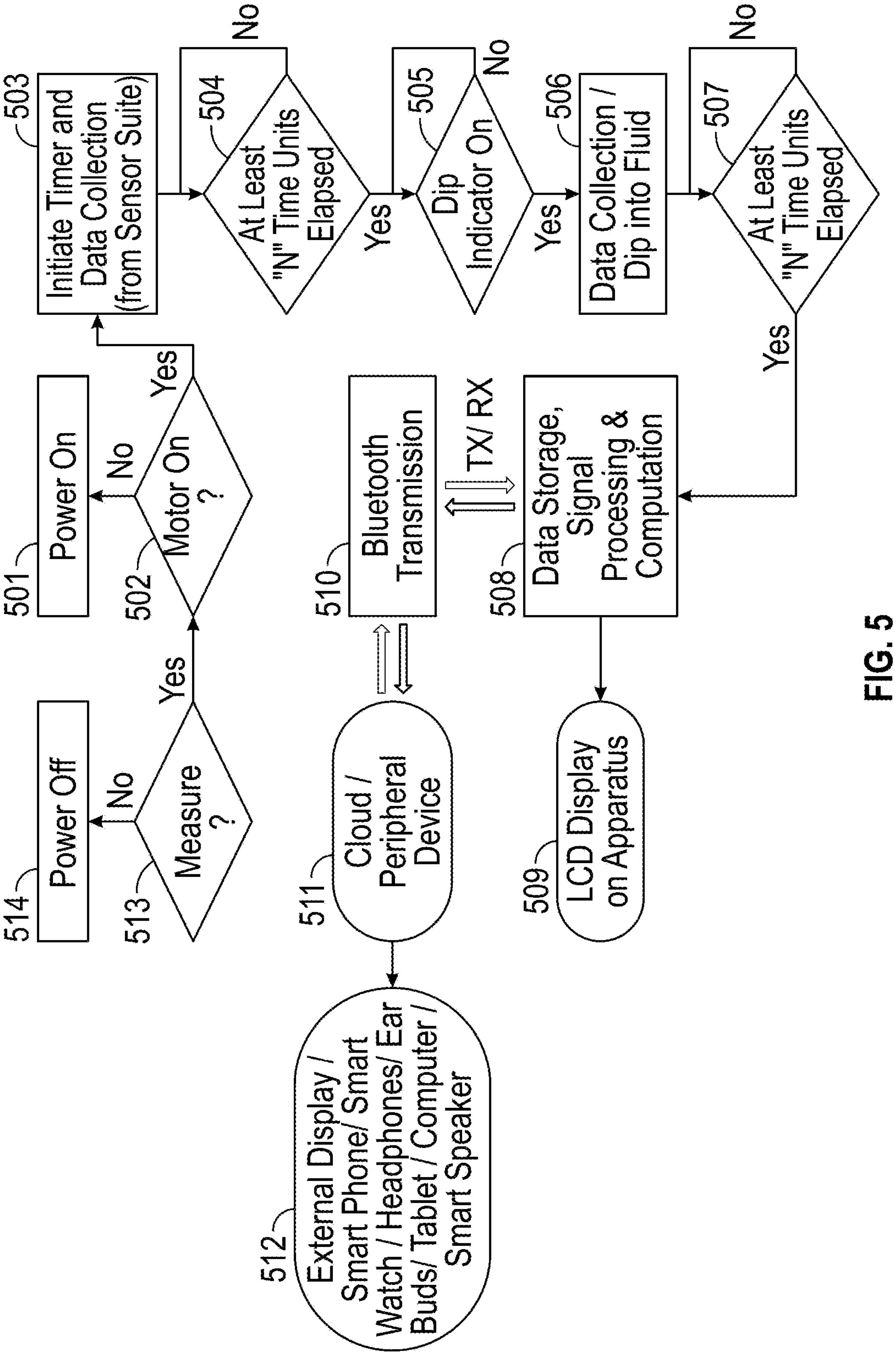
FIG. 5 illustrates a flowchart for a method of use of the apparatus of this invention.

FIG. 5 illustrates a flowchart for a method of use of the apparatus of this invention.

501: Power On

Step 502: Motor On

Step 503: Data Collection from IMU/Temperature/Timer Initiated

Step 504: Check if Waited for "N" Seconds; If waited, move to Step 505. If not waited, move to Step 503

Step 505: Check if Dip Indicator is on; if yes, move to Step 506. If not, move to Step 504

Step 506: Data Collection after vibrating member is dipped into fluid

Step 507: Check if Waited for "N" Seconds; If waited, move to Step 508. If not waited, move to Step 506

Step 508: Data Storage and Process

Step 509: Display Processed Data

Step 510: Full Duplex Communication between Data Storage and Process (509) and Bluetooth Transmission (510)

Step 511: Full Duplex Communication between Bluetooth Transmission (510) and Cloud/Peripheral Device (511)

Step 512: External Display from Cloud/Peripheral Device (511)

Step 513: Check for Measurement is required again; If yes, Move to Step 502—Motor is powered on. If not, move to Step 514

Step 514: Power off

An additional or an alternative measurement mode could include a calibration mode or a calibration routine or a calibration sub-routine where a user calibrates the apparatus, of this invention, before measuring viscosity and/or one or more rheological properties of a fluid or of a test fluid by performing the pre-defined measurement routine/s by:

first, dipping the apparatus, of this invention, into a fluid or a fluid sample with a known (or a pre-calibrated or a reference) viscosity (or associated rheological parameter) value (referred to as the 'calibration fluid' from here on), prior to using the same apparatus for measuring the viscosity (or associated rheological parameter) of the test fluid;

this known, or pre-calibrated, or reference viscosity (or associated rheological parameter) value of the calibration fluid could be given for (or known for, or measured at, or referenced at) various parameters such as temperature/s, humidity, and shear rate/s (singular values or ranges of values for each parameter).

this known, or pre-calibrated, or reference viscosity (or associated rheological parameter) value of the calibration fluid could be registered into, or input by the user into, the apparatus of this invention, before or after the execution of the calibration procedure/routine/sub-routine, either using the apparatus itself or by using a peripheral computation, input, and communication device such as a such as a computer, a laptop, an electronic smart watch, a phone, a smart phone, a smart phone application, a cellular phone or device, a smart hearing device such as electronic earbud/s or headphone/s or hearing aid/s or smart speakers;

additionally, one or more calibration fluids of same or different viscosity (or associated rheological parameter) values could be utilized for the calibration procedure/routine/sub-routine described here.

Figure 6:
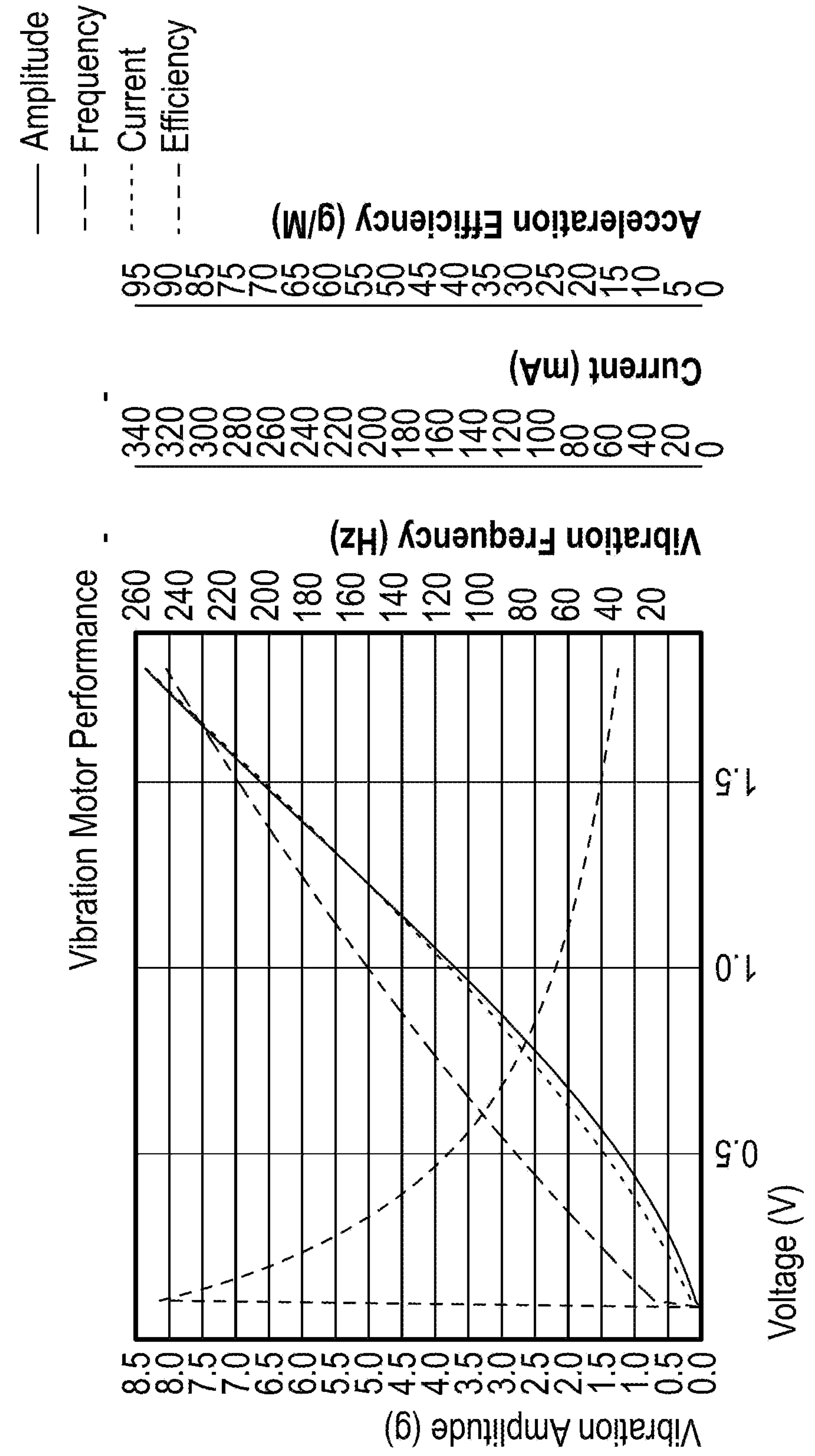
FIG. 6 illustrates an exemplary embodiment's motor specifications which is used in association with the apparatus of this invention.

FIG. 6 illustrates an exemplary embodiment's motor specifications which is used in association with the apparatus of this invention.

Figure 7:
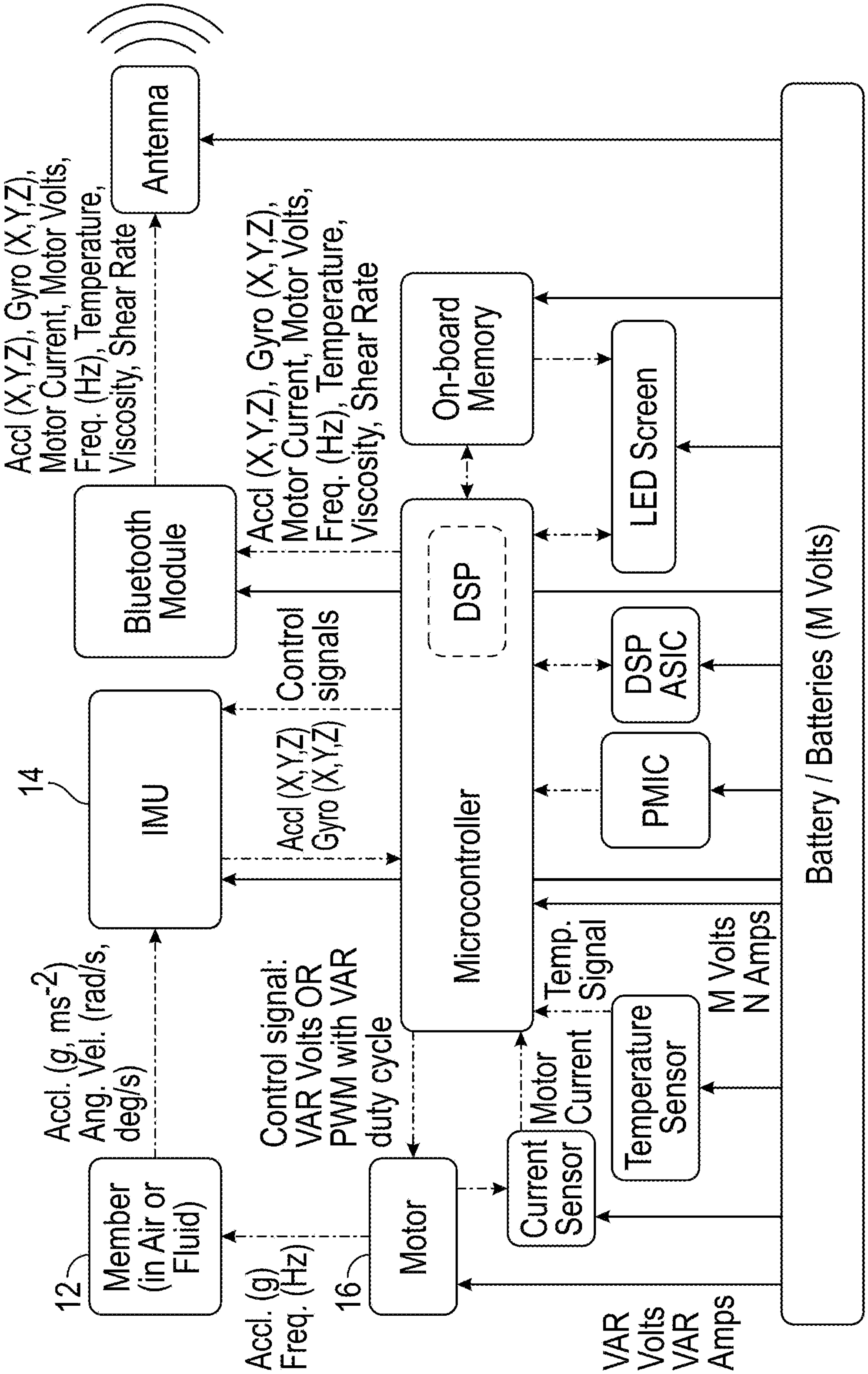
FIG. 7 illustrates a system level block diagram followed by the apparatus of this invention.

FIG. 7 illustrates a system level block diagram followed by the apparatus of this invention.

According to a non-limiting exemplary embodiment, the apparatus, of this invention, was configured with an accelerometer having a single-axis output and the member, having this accelerometer, is dipped and removed from a volume of a viscous medium or fluid (Newtonian or non-Newtonian) such as curry ketchup or honey.

Figure 8:
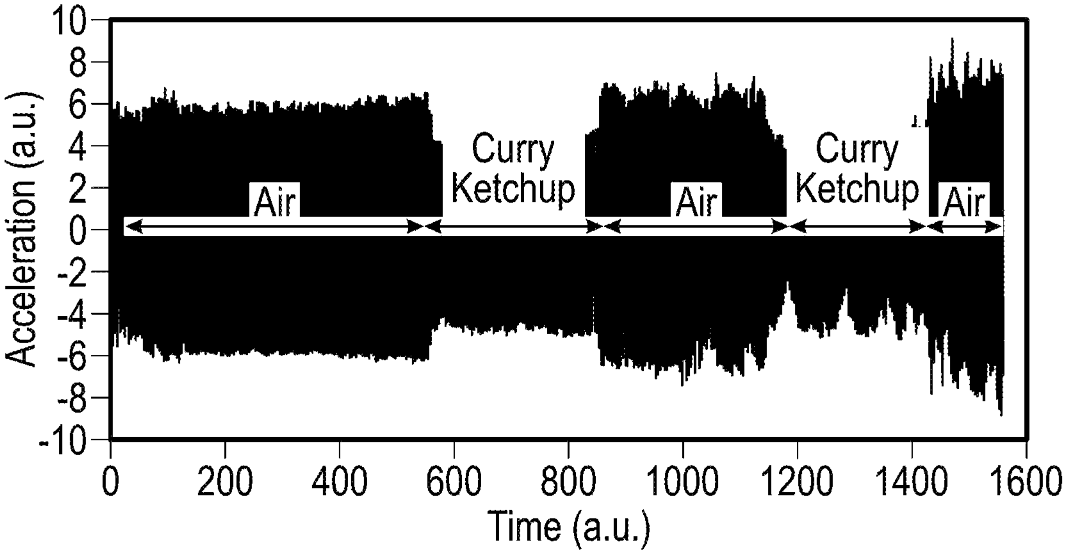
FIG. 8 illustrates a graph of accelerometer output that is measured/recorded as the vibrating member is dipped and removed from a volume of curry ketchup repeatedly.

FIG. 8 illustrates a graph of accelerometer output that is measured/recorded as the vibrating member is dipped and removed from a volume of curry ketchup repeatedly.

In the plot, shown in FIG. 8 of the accompanying drawings, accelerometer output is measured/recorded as an oscillating/vibrating viscometer member is dipped and removed from a volume of curry ketchup. The plot shows that as viscosity of the medium surrounding the vibrating member increases in the volume of curry ketchup, the amplitude of the acceleration sensed by the accelerometer decreases. The opposing drag force exerted on the motion of the oscillating member increases as the viscosity of the medium surrounding the member increases, which, in turn, decreases the net force acting on the member for a given/constant (or nearly constant) member excitation/driving force (provided by the motor). The reduced net force, in turn, results in a smaller acceleration amplitude when the member is oscillating in a more viscous fluid, as shown in the plots. Moreover, the acceleration amplitude returns to its prior, larger value/s when the oscillating member is removed from the fluid and into air again, as shown in the plots below. The change in acceleration amplitude can be hypothesized to be dependent upon, and, proportional to the difference in the viscosity of the two media surrounding the oscillating member, that is, $\propto\Delta\eta=\eta_{fluid}-\eta_{air}$, and this relation can be used to calculate the unknown viscosity of the fluid, given the known viscosity of air at a known/measured temperature and pressure (for increased precision).

Figure 9:
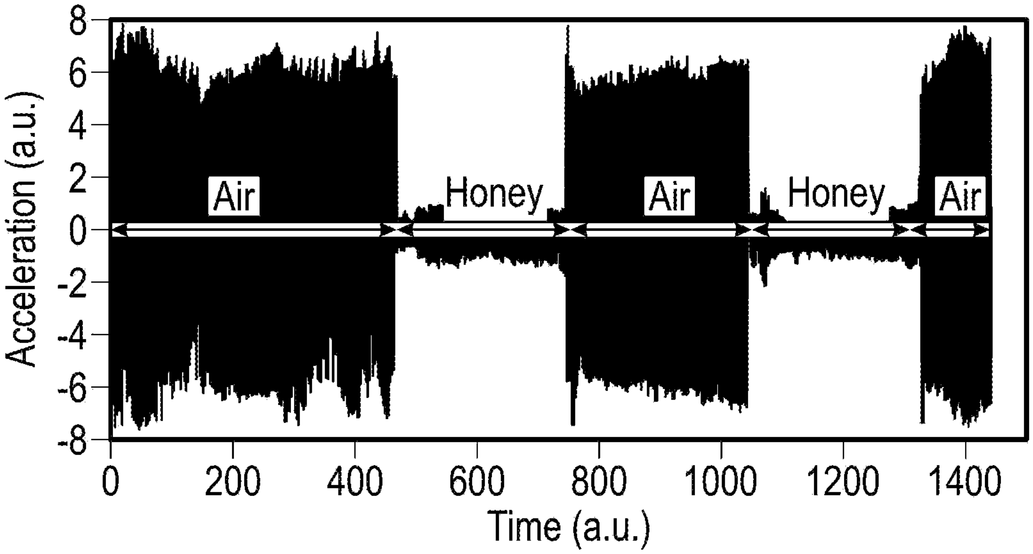
FIG. 9 illustrates a graph of accelerometer output that is measured/recorded as the vibrating member is dipped and removed from a volume of honey.

FIG. 9 illustrates a graph of accelerometer output that is measured/recorded as the vibrating member is dipped and removed from a volume of honey.

The acceleration measurement, discussed above, for curry ketchup is then repeated for a heuristically more viscous fluid: honey. The acceleration measurement exhibits the same trend as that noticed for curry ketchup, with the acceleration amplitude decreasing whenever the oscillating member is dipped in honey and then increasing back to its prior value whenever the member is removed from honey and into air.

Figure 10:
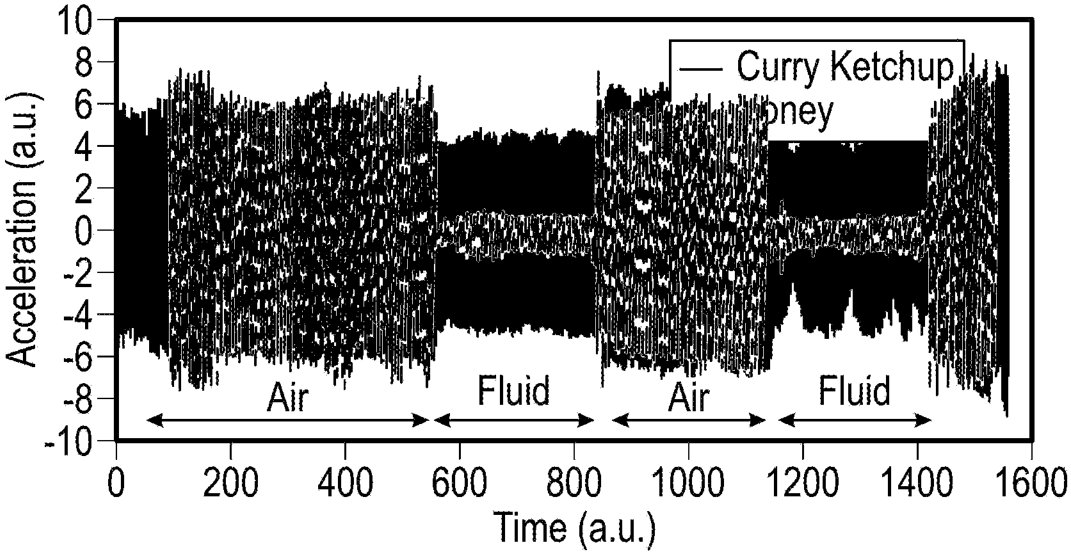
FIG. 10 illustrates a graphical comparison of acceleration amplitude change for fluids of different viscosity (curry ketchup of FIG. 8 and honey of FIG. 9)

FIG. 10 illustrates a graphical comparison of acceleration amplitude change for fluids of different viscosity (curry ketchup of FIG. 8 and honey of FIG. 9).

The oscillating member acceleration waveforms shown in the plots, of Figure of the accompanying drawings, for curry ketchup and honey are now plotted on the same axes, to compare and highlight the greater change (decrease) in acceleration amplitude for member oscillations in more viscous fluids. Since honey is visibly/heuristically more viscous ("thicker") than curry ketchup, it was expected that the acceleration amplitude decreases more when the oscillating member is dipped into it as compared to in curry ketchup. The plot, of FIG. 10, shows this trend: the acceleration amplitude of the vibrating member is significantly smaller in honey than it is in curry ketchup. Also noticeable is that the acceleration amplitude returns to its nominal value in air when the vibrating member is removed from the viscous fluid (whether it is curry ketchup or honey) and that this nominal value is approximately the same from dip to dip and from measurement to measurement (across different fluids). Note that in the plot of FIG. 10, the honey waveform (red) is shifted along the time axis, w.r.t the curry ketchup waveform (blue) so as to roughly align periods of oscillations in the viscous fluids and, thereby facilitate an easier comparison of the acceleration amplitudes between the two sets of measurements (honey vs. curry ketchup).

Therefore, the plot comparing the acceleration data for honey and curry ketchup (w.r.t. air as baseline), as seen in FIG. 10, shows that the change in member acceleration is proportional to the change in viscosity as the medium surrounding the vibrating member is changed, that is, $\propto\Delta\eta=\eta_{fluid}-\eta_{air}$, as desired in an embodiment of this invention.

Figure 11:
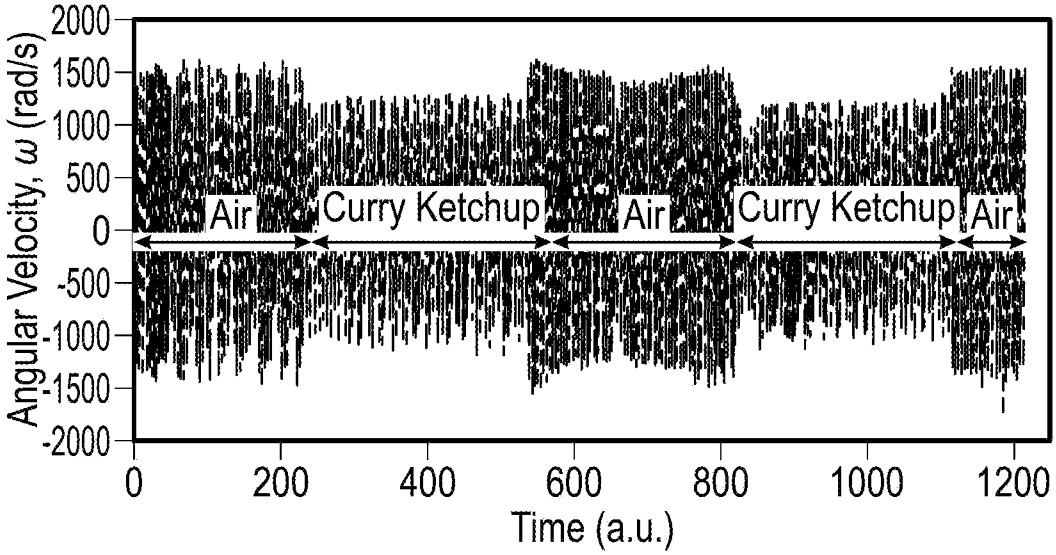
FIG. 11 illustrates a graphical plot of a gyroscope (or angular rate sensor) output obtained/measured/recorded as the oscillating/vibrating element or member, of this invention, is dipped and removed from a volume of curry ketchup repeatedly.

FIG. 11 illustrates a graphical plot of a gyroscope (or angular rate sensor) output obtained/measured/recorded as the oscillating/vibrating element or member, of this invention, is dipped and removed from a volume of curry ketchup repeatedly. The plot, of FIG. 11, shows that as viscosity of the medium surrounding the vibrating member increases when it is dipped in the volume of curry ketchup, the amplitude of the angular velocity sensed by the angular rate sensor/gyroscope decreases. Furthermore, the frequency of the sensed angular velocity signal also decreases when the member is vibrating in a more viscous medium as shown by the sparser density of peaks (relative to that measured/recorded during vibration in air) during the periods of reduced amplitude in the plot shown in FIG. 11

Figure 12:
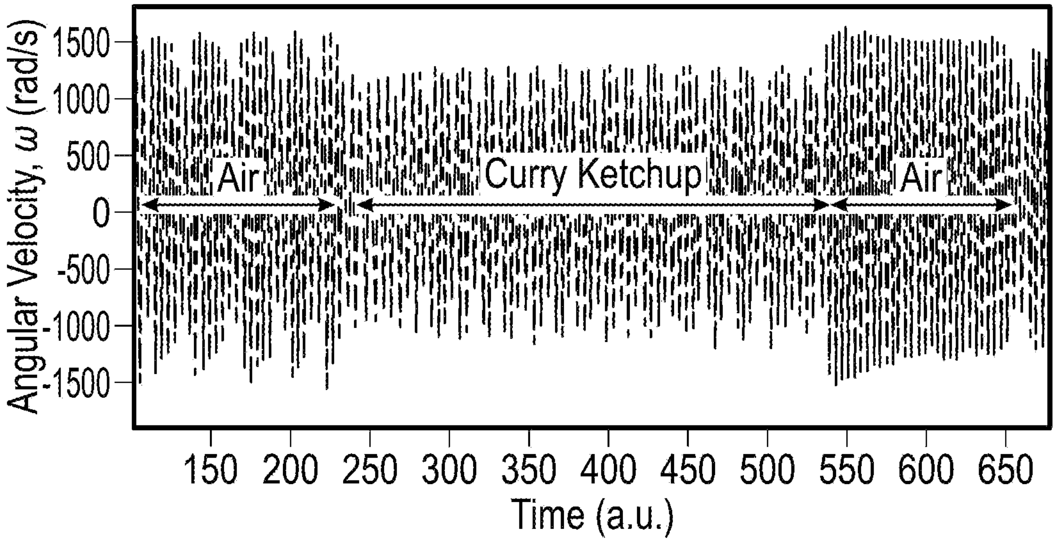
FIG. 12 illustrates a graphical plot where only part of the measurement shown in FIG. 11 is plotted.

FIG. 12 illustrates a graphical plot where only part of the measurement shown in FIG. 11 is plotted to emphasize the decrease in frequency and the corresponding increase in the time period between consecutive peaks during immersion into the more viscous fluid, a segment that is also marked by a decrease in the oscillation waveform amplitude. The frequency of angular velocity corresponds to a parameter that is proportional to the time rate of change of angular velocity, that is, proportional to the angular acceleration, a, of the oscillating member. Therefore, the plot in FIG. 12 shows that the change in angular acceleration is proportional to the change in viscosity as the medium surrounding the vibrating member is changed, that is, $\alpha\propto\Delta\eta=\eta_{fluid}-\eta_{air}$.

In an embodiment, a temperature sensor is configured on the member (12) (or at its distal end portion) such that the temperature sensor senses fluid temperature when the member is dipped into a fluid whose viscosity (or one or more rheological property) is to be sensed/detected. Here, another signal is measured which is sensed temperature data. This enables the user to obtain viscosity (or associated rheological parameter) values simultaneously with temperature values. This signal is used, further, to calculate viscosity (or associated rheological parameter) and/or adjust the measured value of the fluid's viscosity and/or other rheological and/or physical parameters of the fluid.

In an embodiment, surface functionalization or nanostructuring or texturing or coating of the vibrating member (12) can be done such that paint/glue/blood/other non-Newtonian fluid/or Newtonian fluid/or fluid does not stick to the member and the rod is easy to clean or reuse after a measurement.

In some embodiments, a pressure sensor is configured on the member (12) (or at its distal end portion or at a handle or at a motor housing) such that the sensor senses fluid pressure when the member is dipped into a fluid whose viscosity (or associated rheological parameter) is to be sensed/detected.

Here, another signal is measured which is sensed pressure data. This enables the user to obtain viscosity values simultaneously with pressure values. This other signal is used, further, to calculate viscosity (or associated rheological parameter) and/or adjust the measured value of the fluid's viscosity and/or other rheological and/or physical parameters of the fluid.

Figure 13A:
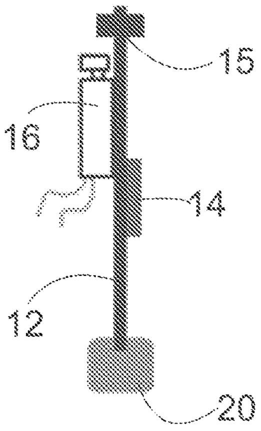
FIGS. 13*a*, 13*b*, and 13*c* illustrate various views of a shear-rate rheometry apparatus or, preferably, an attachment for the viscometer apparatus of FIG. 1.
Figure 13B:
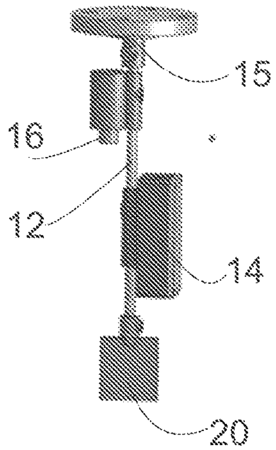
Figure 13C:
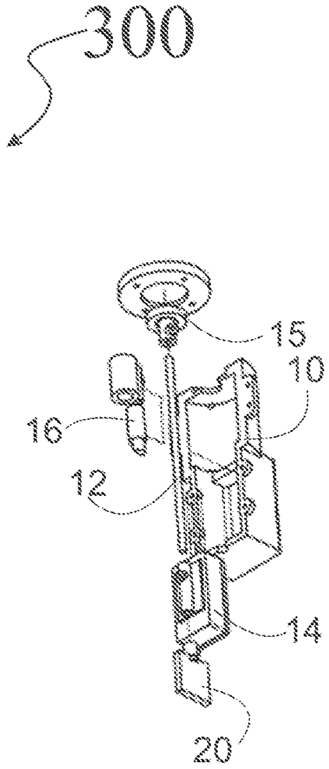

FIGS. 13*a*, 13*b*, and 13*c* illustrate various views of a shear-rate rheometry apparatus or, preferably, an attachment for the viscometer apparatus of FIG. 1.

Figures 14A, 14B:
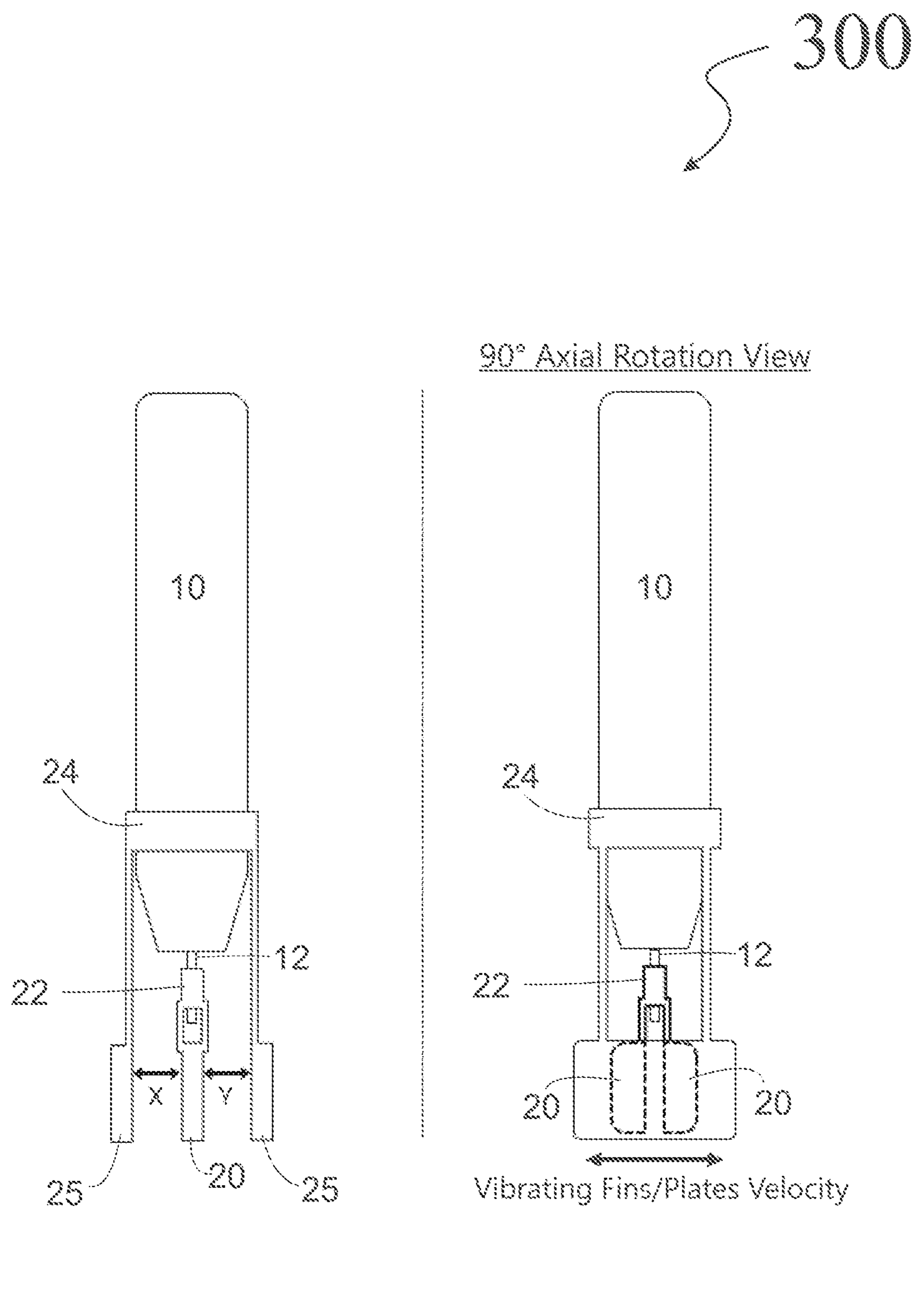
FIG. 14*a* illustrates one view of a shear-rate rheometry apparatus or, preferably, an attachment for the viscometer apparatus of FIG. 1.
FIG. 14*b* illustrates a 90 degree axially rotate view of the view of FIG. 14*a;*

FIG. 14*a* illustrates one view of a shear-rate rheometry apparatus or, preferably, an attachment for the viscometer apparatus of FIG. 1.

Figure 25:
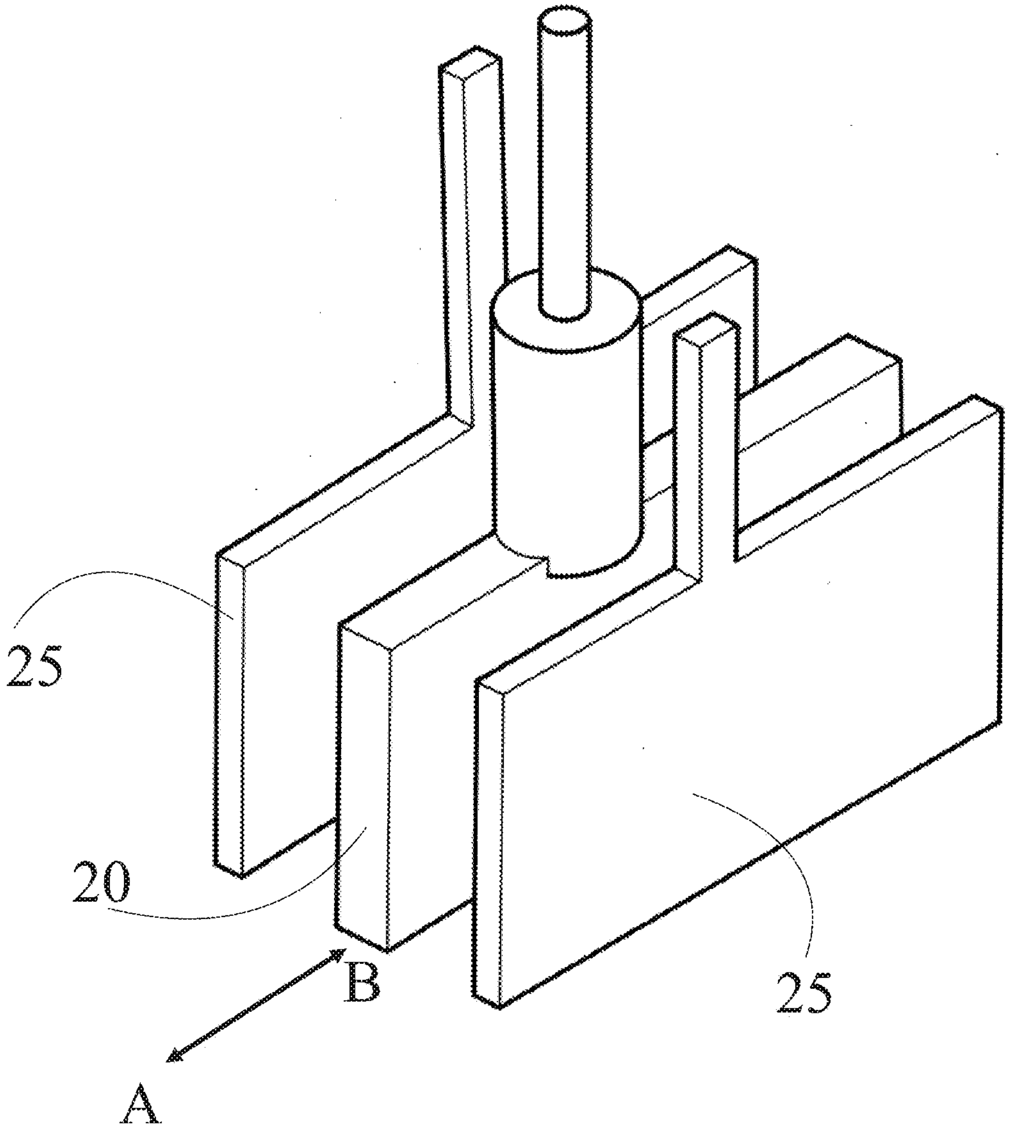
FIGS. 25, 26, and 27 illustrate a detail of the plates and/or fins attached to the viscometer apparatus of FIG. 1.
Figure 26:
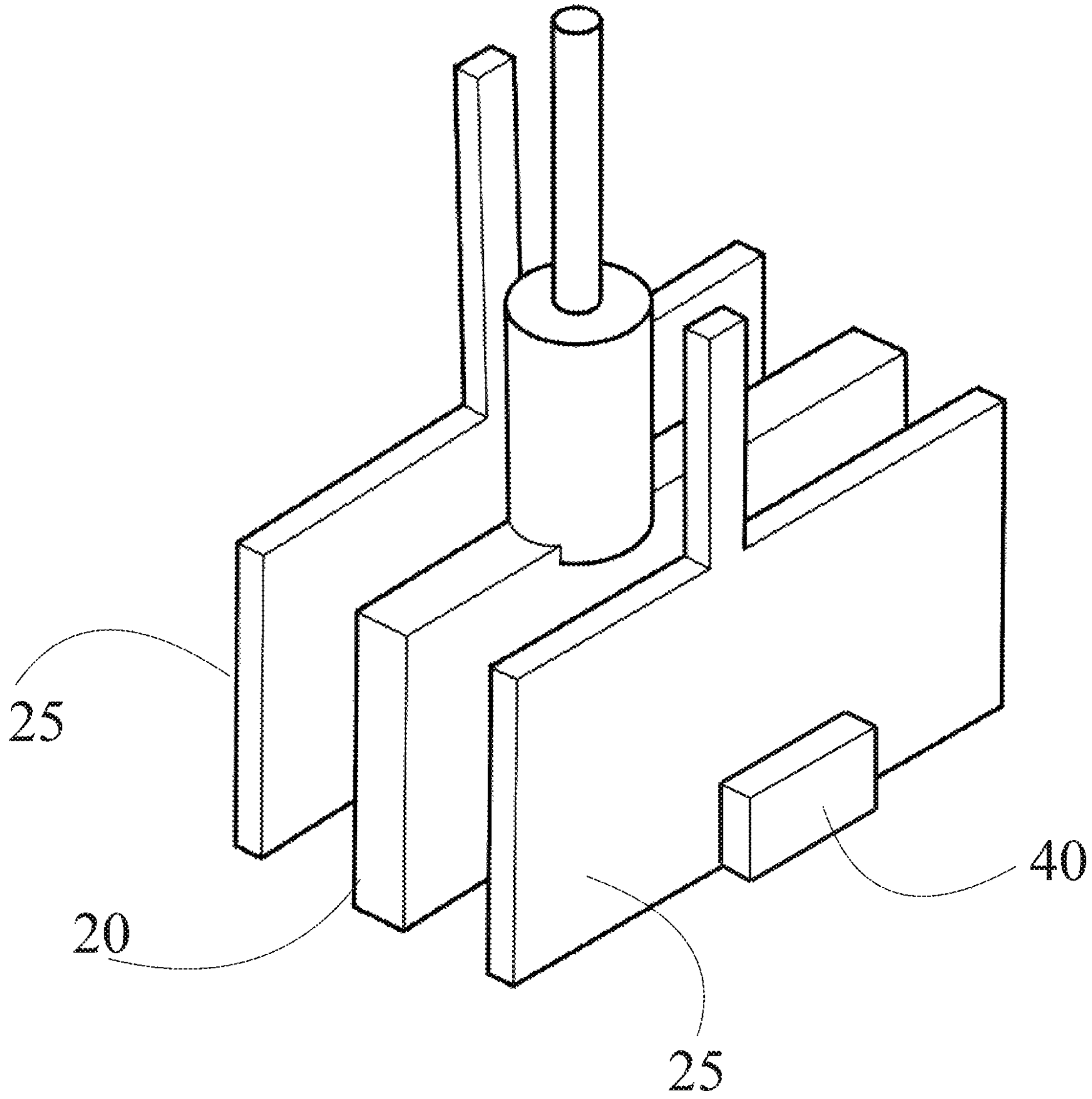
Figure 27:
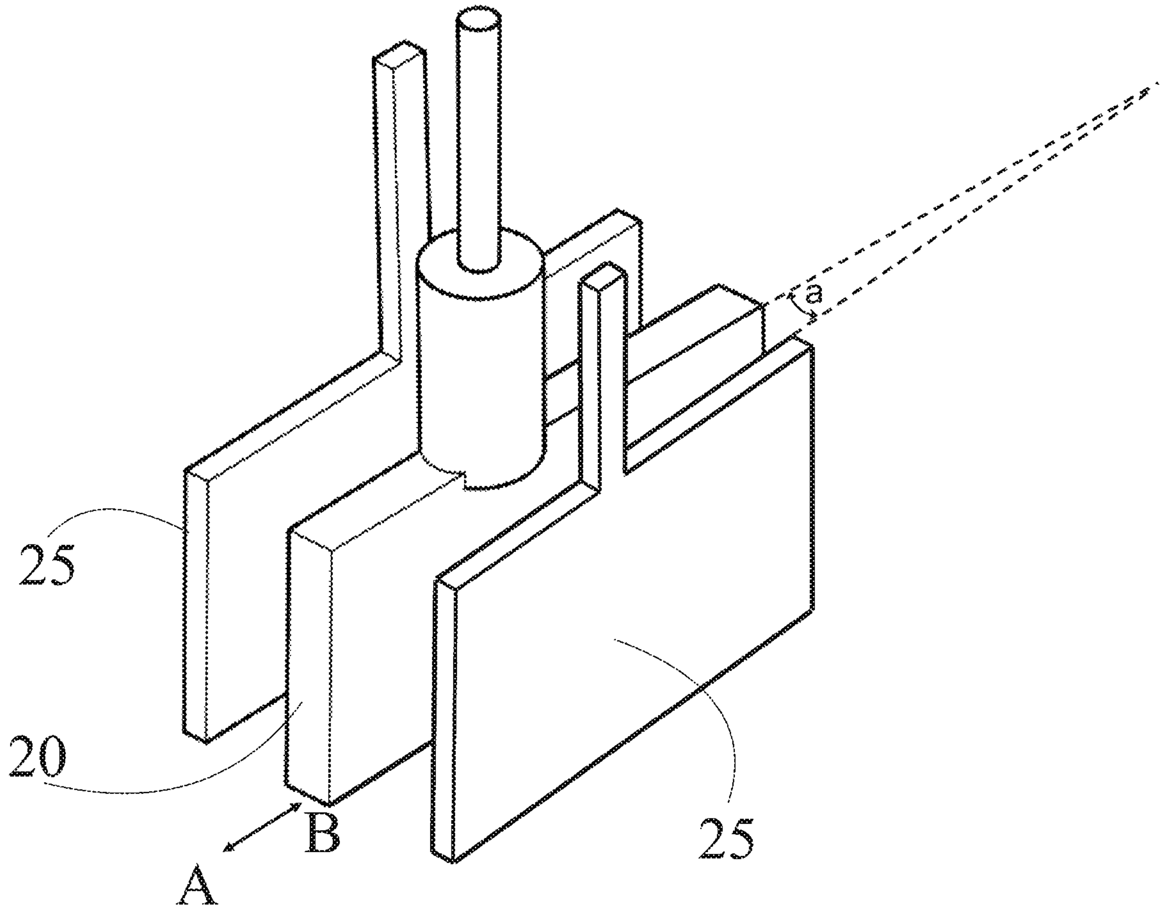

FIG. 14*b* illustrates a 90 degree axially rotated view of the view of FIG. 14. FIGS. 25-27 illustrate a detail of the plates or fins that may be static or vibrating in the A-B direction shown. Two static fins (25) may be on either side of a central vibrating fin (20) such that one or more of side fins (25) have their largest face along a plane which is either parallel to, or within 45 degrees of angular displacement (a) with respect to, the plane corresponding to the largest face of a central fin (20). The fins may include one or more temperature sensors (40).

The shear rate, Rshear, for a fluid flowing between two parallel plates, one moving at a constant speed or velocity, v, and the other one stationary, is given by $$R_{shear}=\frac{v}{d}$$

where, d is the distance between the two parallel plates. In the case of simple shearing of the viscous fluid, it is the gradient of velocity in that fluid. In fluid dynamics, the aforementioned configuration of viscous fluid flow in the space between two parallel surfaces, one of which is moving tangentially, in its own plane, relative to the other, is also described as Couette flow. If the velocity of the moving plate, v, is measured in meters per second (ms−1), and the distance between the two parallel plates, d, is measured in meters, then the shear rate is measured in reciprocal seconds or inverse seconds (s−1). In the case of sinusoidal harmonic motion or sinusoidal motion or oscillatory motion of one of the parallel plates, in its own plane, relative to the other plate (or with respect to the stationary plate), the velocity of the moving plate, v, is sinusoidal also. In the aforementioned sinusoidal harmonic motion case, the shear rate for a viscous fluid is proportional to the root mean square (RMS) value (over an integer number of oscillation cycles) of the velocity of the moving plate, vRMS, relative to the stationary plate. Alternatively, since the RMS value of the velocity of the plate in sinusoidal harmonic motion, vRMS, is proportional to its velocity amplitude, V0, that is, $V_0=\sqrt{2}\cdot V_{RMS}$, the shear rate for the viscous fluid is also proportional to the amplitude of the velocity of the moving plate, V0, relative to the stationary plate.

In an exemplary embodiment of the viscosity measurement apparatus or the rheometry apparatus, in order to calculate/compute the shear rate for a viscous fluid that the apparatus member is dipped in, the velocity of the moving plate or the moving fin that is attached to the sinusoidally vibrating or oscillating member (or rod) of the apparatus can be measured or calculated or computed using the outputs of the one or more accelerometers and/or the one or more gyroscopes disposed on the apparatus member and/or disposed on the fins/plates that are attached to the apparatus member. In this embodiment, the apparatus can therefore be used to characterize the viscosity or the static viscosity (or other rheological properties) of fluids at different shear rates, or as a function of a range of shear rate values. Such a shear-rate-dependent characterization of fluid viscosity and/or other rheological properties is important, and often critical, for a wide variety of fluids, including Newtonian fluids, and especially, for non-Newtonian fluids. The viscosity of non-Newtonian fluids is dependent on the shear rate of the fluid. Therefore, the aforementioned embodiment of the apparatus can be used to establish a known shear rate of the viscous fluid into which it is dipped, and measure the viscosity of that fluid at that shear rate. The fluid shear rate can also be varied by changing the frequency of vibration of the apparatus member (by varying the motor vibration frequency, by changing the applied motor voltage and/or current), thereby changing the velocity or the speed of the fin or the plate that is in motion, or in sinusoidal harmonic motion, in its own plane, relative to the parallel fin or plate (or with respect to the parallel stationary plate). The fluid viscosity measurement can then be repeated at another fluid shear rate value. This process can be repeated to characterize the viscosity, or the static viscosity, or a rheological property, of a fluid, as function of the fluid shear rate (and other parameters such as temperature), over a range of fluid shear rates.

The shear-rate rheometry apparatus, or attachment, typically, comprises one or two static fins or plates (25) on either side of the vibrating fins (20) such that the static fins (25), being laterally located about a medial vibrating fin (20), have their largest face along a plane which is either parallel to, or within 45 degrees of angular displacement, with respect to a medially located vibrating fin (20). The distances, X and Y, could be the same to establish the same shear rate in the viscous fluid on either side of the vibrating fins (20) or could be designed and fabricated/3D-printed/manufactured such that they are of two distinct values to establish two different shear rates in the viscous fluid for a given vibrating fin/member frequency.

In an embodiment of this invention, the apparatus comprises fins collinear to, and attached to, the vibrating member (12). Typically, these fins (20) project operatively downwards from the vibrating member (12); these fins (20) may be vibrating fins (20) or static (non-vibrating) fins (25). These fins (20) could come as either a removable or a permanent attachment. These fins (either in their vibrating phase or in their static phase) are used, along with the vibrating member (12), in order to determine shear rate of the fluid, whose rheological properties are to be measured, using the apparatus, of this invention. Typically, these fins/plates, as they are planar surfaces in nature, increase surface area of the part of the apparatus that is dipped into fluid; which, in turn, increases drag force/s and or viscous force/s exerted by the fluid and experienced by the vibrating part of the apparatus; which, in turn, decreases total force/s acting on the vibrating part of the apparatus. These forces can be sensed, with the apparatus of this invention, to determine viscosity (or one or more rheological parameters) of the fluid and other rheological properties of the fluid.

In some embodiment, the fins project in an operatively downward manner, co-axially, laterally, or radially with respect to said member.

The equation that expresses the impedance encountered by the vibrating member in the viscous fluid is given by:

$$Z_{mech} = A\sqrt{\pi\eta\rho f}$$

where A is the planar surface area of the vibrating fins, f is the frequency of the vibrating member, η is the viscosity of the fluid and ρ is the density of the fluid.

The use of such fins/plates increases at least one of the following: sensitivity, measurement signal strength, signal fidelity, signal accuracy, signal precision.

In some embodiments, an outer housing (10) ensconces or attaches to a portion of the vibrating member (12) such that a distal end portion/stub of the vibrating member (12), which is to be dipped in fluid, whose rheological parameters are to be measured, is protruding.

In preferred embodiments, vibrating fins (20) are collinear and coaxial to the vibrating member (12) and extend, operatively downwards, beyond the distal end portion of the operative member.

In preferred embodiments, static fins (25) are spaced apart from the vibrating fins (20). Preferably, static fins (25) are two, diametrically opposite, fins having planar surfaces parallel to/facing the central vibrating fin (20).

In some embodiments, the static fins (25) are located on a locus of points equidistant from the vibrating fins (20); these leave value X (distance of a first static fin from the central vibrating fin) to be same as value Y (distance of a static fin from the central vibrating fin). The distances X and Y could be the same to establish the same shear rate on either side of the vibrating fins.

In some embodiments, the static fins (25) are located on a locus of points non-equidistant from the vibrating fins (20); these leave value X (distance of a first static fin from the central vibrating fin) to be different than value Y (distance of a static fin from the central vibrating fin). The distances X and Y could be the different to establish the different shear rates (two distinct values to establish two different shear rates) on either side of the vibrating fins. This allows for faster measurement, better correlation, and more accurate data.

In one embodiment, of the fluid viscosity (or one or more rheological parameters) measurement/characterization apparatus, of this invention, the portion of the apparatus or the member (12) that is either partially or fully dipped into the fluid (whose viscosity and/or rheological property is to be measured) can have an enlarged face (20), as shown, at least, in FIGS. 13*a*, 13*b*, 13*c* to increase sensitivity of the measurement apparatus or increase strength of one or more measured/obtained signals or signal parameters such as signal amplitude, signal range, and/or signal-to-noise ratio (SNR). These structures, with enlarged faces, typically, are fins or plates or structures (such as hollow spherical shell/s or solid spherical object/s) that increase apparatus sensitivity or measurement signal strength or measurement signal fidelity or measurement signal accuracy or measurement signal precision. Enlarging the face of the part of the apparatus (such as the member) that vibrates or oscillates, increases surface area of the apparatus that interacts with drag force or frictional force exerted on the apparatus due to viscosity (or associated rheological parameter) of the fluid/liquid/medium in which that part of the apparatus is vibrating/moving/oscillating. This drag force or the frictional force exerted on the vibrating/moving/oscillating part, of the apparatus, due to the viscosity (or some such rheological property) of the fluid/liquid/medium is proportional to the surface area of the moving element of the apparatus, and it opposes motion of this moving element. This drag force or the frictional force exerted on the vibrating/moving/oscillating part of the apparatus due to the viscosity (or associated rheological parameter) of the fluid/liquid/medium is proportional to the viscosity of the fluid/liquid/medium. In an exemplary embodiment, of the fluid viscosity measurement apparatus or the fluid rheological property characterization apparatus, this drag force or viscous force can be sensed and/or measured, and be processed, and be used to calculate/measure the viscosity, or one or more rheological properties, of the fluid/liquid medium.

Since the drag force or the frictional force exerted on the vibrating/moving/oscillating part of the apparatus due to the viscosity (or associated rheological parameter) of the fluid/liquid/medium is proportional to the surface area of the moving element of the apparatus, a larger surface area, therefore, results in a larger drag force (or frictional force or viscous force) that opposes or impedes the motion of the vibrating/moving/oscillating part/element of the apparatus, which in turn, decreases the total force (or the net sum of forces) acting on the actuated, vibrating element (12) of the apparatus (the member). This decrease in the total force (or the net sum of forces) acting on the vibrating/moving/oscillating part/element of the apparatus results in a decrease in the amplitude of the acceleration and the amplitude of the velocity of the vibrating/moving element of the apparatus when a portion of that vibrating element of the apparatus is dipped into a more viscous medium such as a liquid/fluid. Similar decreases are also observed for parameters such as the amplitude of the angular velocity of the vibrating member and the amplitude of the angular displacement of the vibrating member. This decrease in the total force (or the net sum of forces) acting on the vibrating/moving/oscillating element of the apparatus, and the associated decrease in the amplitude of the acceleration, or in the amplitude of the velocity, or in the amplitude of the angular velocity, or in the amplitude of the angular displacement, of the vibrating/moving element of the apparatus, when a portion of that vibrating element of the apparatus is dipped into a more viscous medium such as a liquid/fluid, is proportional to the viscosity (or associated rheological parameter) of that liquid/fluid/medium, and/or is proportional to one or more rheological properties or parameters of that liquid/fluid medium such as the density of the fluid, or the square-root of the product of the viscosity (or associated rheological parameter) and the density of the fluid, or the square-root of the product of the viscosity (or associated rheological parameter) the density of the fluid and the frequency of the apparatus element vibration/oscillation. In an exemplary embodiment, of the fluid viscosity measurement apparatus or the fluid rheological property characterization apparatus, of this invention, the aforementioned decrease in total force (or net sum of forces) acting on the vibrating/moving/oscillating element of the apparatus, or decrease in amplitude of the acceleration, or decrease in amplitude of velocity, or decrease in amplitude of angular velocity, or decrease in amplitude of angular displacement, of the vibrating/moving element of the apparatus, when a portion of that vibrating element, of the apparatus of this invention, is dipped into a more viscous medium such as a liquid/fluid, can be sensed and/or measured, and be processed, and be used to calculate/measure the viscosity, or one or more rheological properties, of the fluid/liquid medium, such as the product of the viscosity (or associated rheological parameter) and the density of the fluid/liquid, or its static viscosity. Alternatively, the calculated/measured viscosity, or one or more rheological properties, of the fluid/liquid medium, such as the product of the viscosity (or associated rheological parameter) and the density of the fluid/liquid, or its static viscosity can be measured or specified as function of the shear rate of the fluid/liquid or as a function of the vibration/oscillation/actuation frequency of the moving element of the apparatus.

Since the aforementioned decrease (or change) in the total force (or the net sum of forces) acting on the vibrating/moving/oscillating element of the apparatus—or the decrease (or change) in amplitude of acceleration, or decrease (or change) in amplitude of velocity, or decrease (or change) in amplitude of angular velocity, or decrease (or change) in amplitude of angular displacement of vibrating/moving element of the apparatus—when a portion of that vibrating element is dipped into a more viscous medium such as a liquid/fluid, is proportional to the surface area of the apparatus that interacts with the drag force or the frictional force exerted on the apparatus due to the viscosity (or associated rheological parameter) of the said fluid/liquid medium, the presence of structures with enlarged surface area/s—such as fins or plates or structures (such as hollow shell/s, or solid sphere-like object/s) that increase the surface area of the part of the moving element of the apparatus that is dipped into the fluid/liquid—can be employed to increase the measurement sensitivity or the measurement signal strength or the measurement signal fidelity or the measurement signal accuracy or the measurement signal precision of the apparatus. Some exemplary embodiments of such structures with enlarged face/s are shown, at least, in FIG. 13 and FIG. 16.

In one exemplary embodiment of the measurement apparatus, the fin-like, or plate-like, or shell-like, or hollow spherical shell-like, structures of enlarged face/s can be formed as part of a single (monolithic) element of the measurement apparatus that can be actuated to move/vibrate/oscillate (such as a member that can be attached to a motor), as shown in FIG. 16(*c*). In another exemplary embodiment of the measurement apparatus, the fin-like, or plate-like, or shell-like, or hollow spherical shell-like, structures of enlarged face/s can be attached to the element of the apparatus that can be actuated to move/vibrate/oscillate (such as a member attached to a motor), as shown in FIGS. 16(*a*), 16(*b*), 16(*c*), 16(*d*), and 16(*e*). These structures of enlarged face/s can also come as an attachment for element of the apparatus that can be actuated to move/vibrate/ oscillate, and be snap-fit or screw-fit or magnetic-lock fit around that element, as shown in exemplary embodiments in FIGS. 13(*b*), 13(*c*), 14(*a*), 14(*b*), 15(*a*), 16(*a*), 16(*b*), 16(*c*), 16(*d*), 16(*e*), 16(*f*), and 16(*g*).

In another embodiment, either plate-like spokes, as shown in FIG. 16(*f*), or individual cylindrical rod-like structures, as shown in FIG. 16(*g*), can protrude from the member. These variations, in geometry, can increase sensitivity/fidelity/ accuracy and/or precision and enable viscosity (or associated rheological parameter) measurement modes that are optimal for specific fluids or measurement conditions.

FIG. 16(*f*.1) illustrates a bottom view, of one embodiment, of the apparatus of FIG. 16(*f*).

FIG. 16(*f*.2) illustrates a bottom view, of another embodiment, of the apparatus of FIG. 16(*f*.)

FIG. 16(*g*.1) illustrates a bottom view, of one embodiment, of the apparatus of FIG. 16(*g*)

In order to decrease or minimize the amount of energy or power that is spent by the power source of the apparatus to actuate or move or vibrate or oscillate the movable element of the apparatus—a portion of which is also dipped into the viscous fluid/liquid—it is prudent to design this movable element and the accompanying structures of enlarged faces (such as the fin-like, or plate-like, or shell-like, or hollow spherical shell-like structures mentioned above) to have a relatively high total (both the member and the fins combined) surface-area-to-mass ratio and/or a relatively high total surface-area-to-volume ratio. Designing with the aforementioned constraint will enable higher nominal acceleration and velocity of the movable element of the apparatus to be achieved, more efficiently, for a given set of actuation parameters such as motor voltage, or motor current, or vibration motor frequency, or motor input power. Relatively high total (both the member and the fins combined) surface-area-to-mass ratio and/or a relatively high total surface-area-to-volume ratio can be achieved enlarging the face of the part/region of the movable element of the apparatus that is to be dipped into the fluid, while keeping the remainder of movable element as light (mass or weight wise) as possible. An exemplary design of the movable element of the apparatus which achieves a relatively high or a higher total surface-area-to-mass ratio (and a higher signal-to-noise ratio or a higher measurement sensitivity) for portable operation, employs an elongate structure, such as a hollow (or a solid) cylindrical member, that is attached to one or more planar fin-like or plate-like structures at its non-clamped or non-anchored end. Some additional exemplary embodiments, of this design, are shown in FIGS. 16(*a*), 16(*b*), 16(*c*), 16(*d*), 16 (*e*), 16(*f*), and 16(*g*).

An exemplary signal can be the amplitude and/or the frequency of the output/s of the IMU sensor/s or the acceleration sensor/s (or the accelerometer/s) or the angular rate sensor/s (or the gyroscope/s) or the motor current or the current sensor/s. Another exemplary signal can be the difference, or the magnitude of the difference, in the amplitude, and/or the frequency, of the output/s of the IMU sensor/s or the acceleration sensor/s (or the accelerometer/s) or the angular rate sensor/s (or the gyroscope/s) or the motor current or the current sensor/s, between two periods of time, one when the apparatus or the member is held in air (and the motor is in the actuated state resulting in the member being in a vibrating state), and the other when the apparatus or the member is dipped and held in a fluid/liquid (and the motor is in the actuated state resulting in the member being vibrated or being a vibrating state).

Yet another signal can be the difference in the amplitude of one or more peaks in the frequency spectrum of the aforementioned signals including the output/s of the IMU sensor/s or the acceleration sensor/s (or the accelerometer/s) or the angular rate sensor/s (or the gyroscope/s) or the motor current or the current sensor/s. The aforementioned frequency-domain spectrum of the signal can be obtained by using a transform such as the Fourier transform (or the Fast Fourier Transform) between the time and frequency domains of the signal/s. Yet another signal can be the signal that correlates or is proportional to the correlation between the two or more signals mentioned/described above, including (but not limited to) signals corresponding the output of the multiple axes (for example X, Y, Z) of the IMU sensor/s or the acceleration sensor/s (or the accelerometer/s) or the angular rate sensor/s (or the gyroscope/s).

In some embodiments, the vibrating fins (20) comprise integrated temperature sensors.

In some embodiments, static fins (25) comprise integrated temperature sensors.

In at least an embodiment, a first collar (22), which, preferably, ensconces the vibrating member (12), allows for attaching of the vibrating fins (20) to the vibrating member (12).

In at least an embodiment, a second collar (24), which, preferably, ensconces the outer housing (10) which is configured to cover a portion of said member, allows for locating the static fins (25) around the vibrating fins (20). The manner of attachment of the second collar (24) to the outer housing (10) could be any of a snap-fit attachment, a screw-fit attachment, or a magnetic-lock fit attachment.

FIG. 15 illustrates an alternative embodiment, of the shear-rate rheometry apparatus, or attachment for the viscometer apparatus, of FIG. 14. This alternative shear-rate rheometry apparatus or attachment comprises one or two static fins or plates (25) on either side of the vibrating fins (20) such that the static fins (25) have their largest face (or planar surfaces) parallel to that of the vibrating fin/s (20). In this embodiment, there are provided adjustment dials or knobs which enable the distances X and/or Y or both to be varied by a known value, by a user. The variation can be enabled by means of a micrometer turn knob or dial or screw. The apparatus design shown here enables an additional method for establishing and varying shear rates, supplementing the method that relies on varying shear rates electronically by varying the motor vibration frequency (via the motor voltage and/or current).

Figures 15A, 15B:
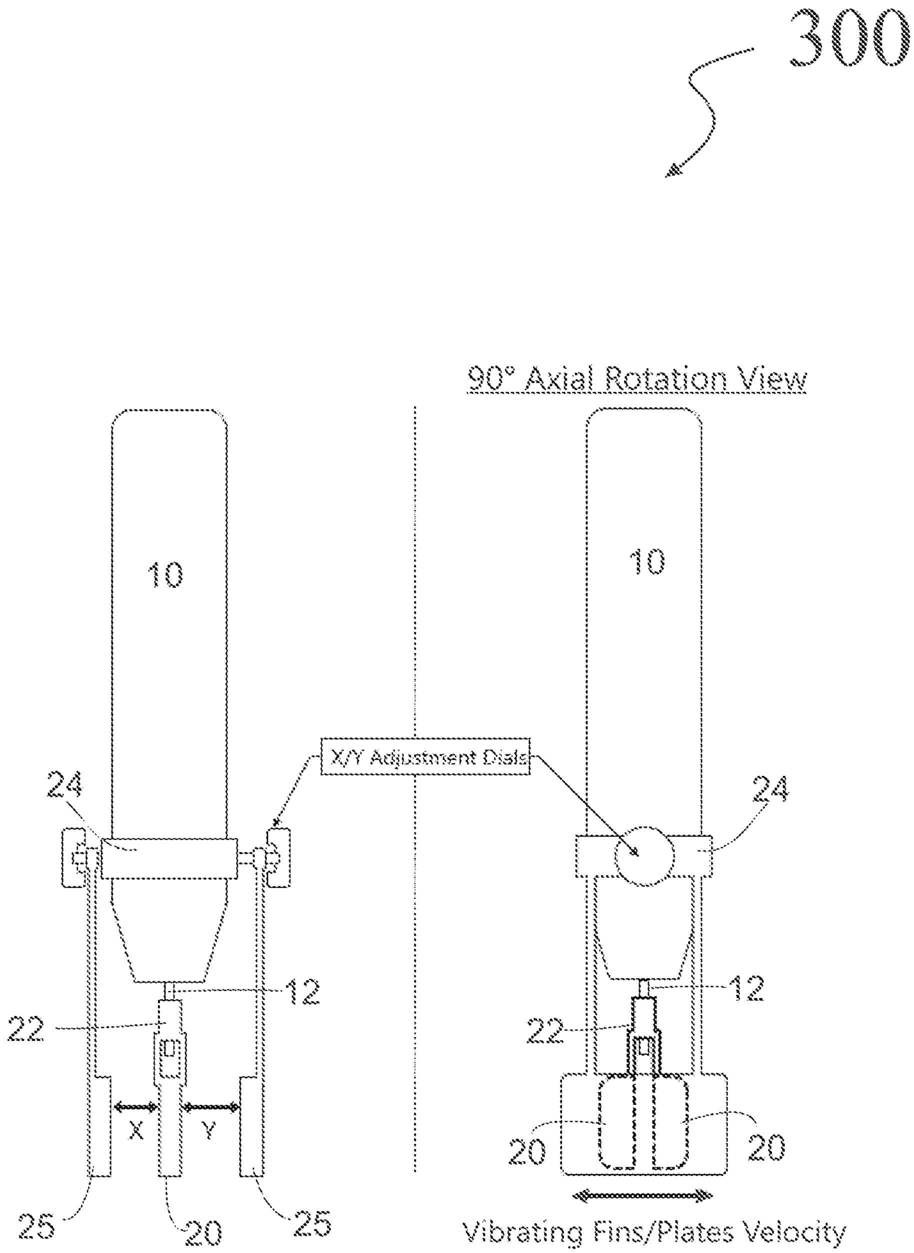
FIG. 15*a* illustrates one view of a shear-rate rheometry apparatus or, preferably, an attachment for the viscometer apparatus of FIG. 1.
FIG. 15*b* illustrates a 90 degree axially rotated view of the view of FIG. 15*a;*
Figure 16A:
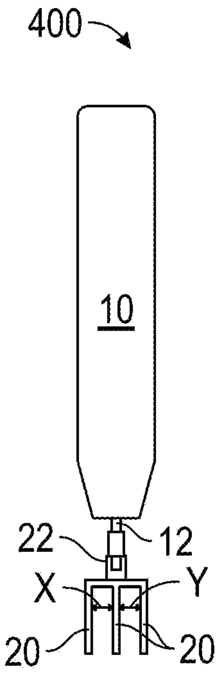
FIGS. 16*a*-16*g* illustrate several alternative embodiments of the viscosity (or one or more rheological property) measurement apparatus with its fins or plates comprising one or more or multiple parallel planar surfaces (i.e. fins and/or plates) that are attached to (or part of) the vibration member or vibration mechanism, as shown in (a), (b), (c), (d), (e), (f), and (g)
Figure 16B:
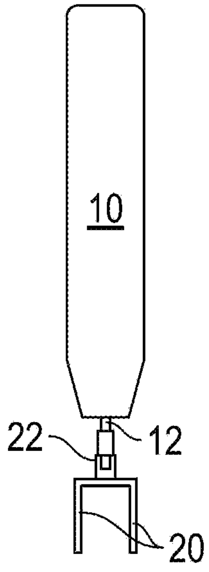
Figure 16C:
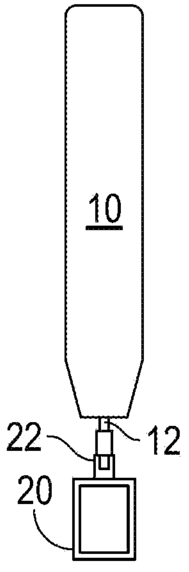
Figure 16D:
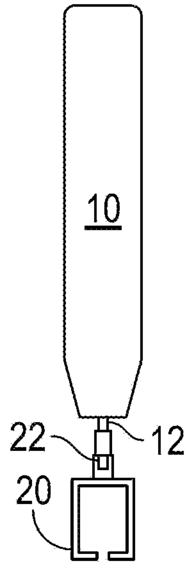
Figure 16E:
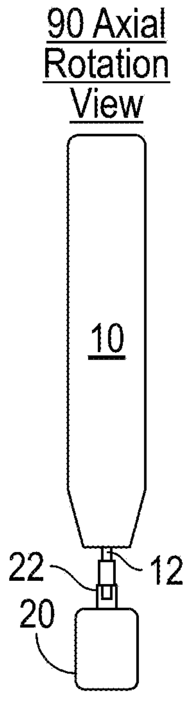
Figure 16F:
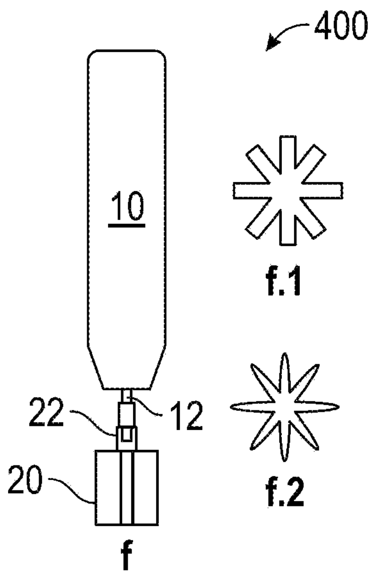
Figure 16G:
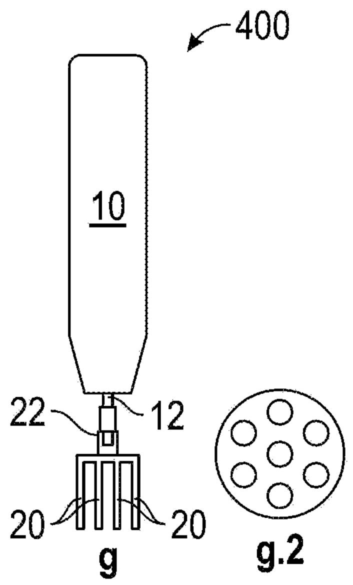

FIG. 15*a* illustrates one view of a shear-rate rheometry apparatus or, preferably, an attachment for the viscometer apparatus of FIG. 1.

FIG. 15*b* illustrates a 90 degree axially rotated view of the view of FIG. 15*a*.

It is to be understood that, in the alternative embodiment, of FIG. 15*a* and FIG. 15*b*, instead of manually adjusting the distances (X and/or Y) between static fins (25) and vibrating fins (20), using a knob or a dial or a screw, separation between the fins (20, 25) may be automated either by pushing a button on the housing (10) or by on-board electronics that take into account existing sensor readings and therefore enable dynamic control of the shear rate.

Signal processing techniques such as bandpass filtering, low pass filtering, high pass filtering, or combinations thereof, could be employed to process the collected data to filter out noise from various sources such as from the handheld operation of the apparatus. In an exemplary embodiment, the aforementioned signal processing techniques could be applied to one or more measured signals such as the acceleration and/or the angular velocity and/or the velocity of the vibrating member and/or of the vibrating fins/plates (20) (that are attached to the mechanical actuation motor via the member), relative to the static fins/plates (25) that are attached to the device outer housing (10). This could, in turn, enable a more precise, or a more accurate, determination of fluid viscosity and/or fluid shear rate.

FIG. 16 illustrates several alternative embodiments of the viscosity (or one or more rheological property) measurement apparatus with its fins or plates comprising one or more or multiple parallel planar surfaces (i.e. fins and/or plates) that are attached to (or part of) the vibration member or vibration mechanism, as shown in (a), (b), (c), and (d) here. The embodiment shown in (a) comprises more than the three parallel plates/fins and these plates could be equidistant from one another (that is X is the distance as Y) or be at varying distances from one another (X is not the same as Y). These multiple fins/plates can be joined into, or be formed as, a part of a single assembly/body/collar/attachment through the use of one or more surfaces that are orthogonal to these fins/plates as shown in (a), (b), (c), and (d) here. These fin/plate attachment designs shown in (a), (b), (c), and (d) share a similar geometry when viewed after a 90-degree-rotation about the longitudinal axis of the viscosity (or one or more rheological property) measurement device, as shown in FIG. 16(*e*).

In some embodiments, these parallel fins/plates are configured to vibrate (in phase) with a same velocity (rigid body motion), when actuated, would increase sensitivity or measurement signal amplitude (and signal-to-noise ratio); because of which a dynamic range of viscosities can be measured with the apparatus of this invention. This is because the multiple parallel fins increase the face that is in contact with the fluid and that, in turn, increases drag force/s (or viscous force/s or frictional force/s that oppose the fin/plate motion) experienced by the fins when they move/vibrate in a viscous fluid/medium, thereby increasing sensitivity of the viscosity (or one or more rheological property) measurement apparatus. The fin/plate attachment designs shown in FIGS. 16(*a*), 16(*b*), 16(*c*), and 16(*d*) share a similar geometry when viewed after a 90-degree-rotation about the longitudinal axis of the viscosity (or one or more rheological property) measurement device, as shown in FIG. 16(*e*).

In addition to the multiple planar surfaces that comprise the fins/plates that, the viscosity (or one or more rheological property) measurement apparatus, of this invention, could also comprise additional surfaces that are orthogonal to one another as also shown in the exemplary embodiments in FIGS. 16(*a*), 16(*b*), 16(*c*), and 16(*d*). These, one or more orthogonal surfaces, would enable the two or more or multiple fins/plates to be joined into, or be formed as, a part of a single assembly/body/collar/attachment. Additionally, these orthogonal surfaces could also enable measurement of additional fluid parameters such as fluid mass density (that is mass per unit volume).

The aforementioned member (12) can be made out of, or be made from, or be comprised of, but not limited to, one or more material/s such as various plastic/s, composites, polymers, carbon fiber, carbon fiber-reinforced polymers, thermosetting polymers such as epoxy, polyester resin, vinyl ester resin, thermoplastic/s, fiberglass, glass, silicon, silicon dioxide, metal/s, metals such as aluminum, copper, nickel, gold, alloys, stainless steel, steel, brass, bronze, wood, resins, acetate, polytetrafluoroethylene (PTFE or Teflon), Polyvinylidene fluoride or polyvinylidene difluoride (PVDF), 3D-printed resins, 3D-printing inks or filaments, polylactic acid (PLA), acrylonitrile butadiene styrene (ABS), poly(methyl methacrylate) (PMMA or acrylic or acrylic glass or Plexiglas or Perspex), polycarbonates.

The aforementioned fins/plates (20, 25) can be made out of, or be made from, or be comprised of, but not limited to, one or more material/s such as various plastic/s, composites, polymers, carbon fiber, carbon fiber-reinforced polymers, thermosetting polymers such as epoxy, polyester resin, vinyl ester resin, thermoplastic/s, fiberglass, glass, silicon, silicon dioxide, metal/s, metals such as aluminum, copper, nickel, gold, alloys, stainless steel, steel, brass, bronze, wood, resins, acetate, polytetrafluoroethylene (PTFE or Teflon), Polyvinylidene fluoride or polyvinylidene difluoride (PVDF), 3D-printed resins, 3D-printing inks or filaments, polylactic acid (PLA), acrylonitrile butadiene styrene (ABS), poly(methyl methacrylate) (PMMA or acrylic or acrylic glass or Plexiglas or Perspex), polycarbonates.

The aforementioned fins/plates and/or the apparatus member can also be textured, or micro-textured, or nano-textured, or coated with one or more surfactant/s, or thin-film coatings or coatings of hydrophilic nature or of hydrophobic nature, self-assembled molecular layers (SAMs), anti-corrosion coatings, anti-stiction coatings, anti-stick coatings, non-stick coatings, durable slippery coatings, or a combination thereof.

According to a non-limiting exemplary embodiment as depicted in FIG. 13, a version of the apparatus was fabricated.

According to one non-limiting exemplary version of the apparatus, data related to viscosity of honey and ketchup was collected. This data is depicted in FIGS. 17, 18, 19, and 20. The raw data is collected in arbitrary units. The horizontal-axis of the plot is the time axis. The data is collected at a sampling frequency of 1000 Hz.

Figure 17:
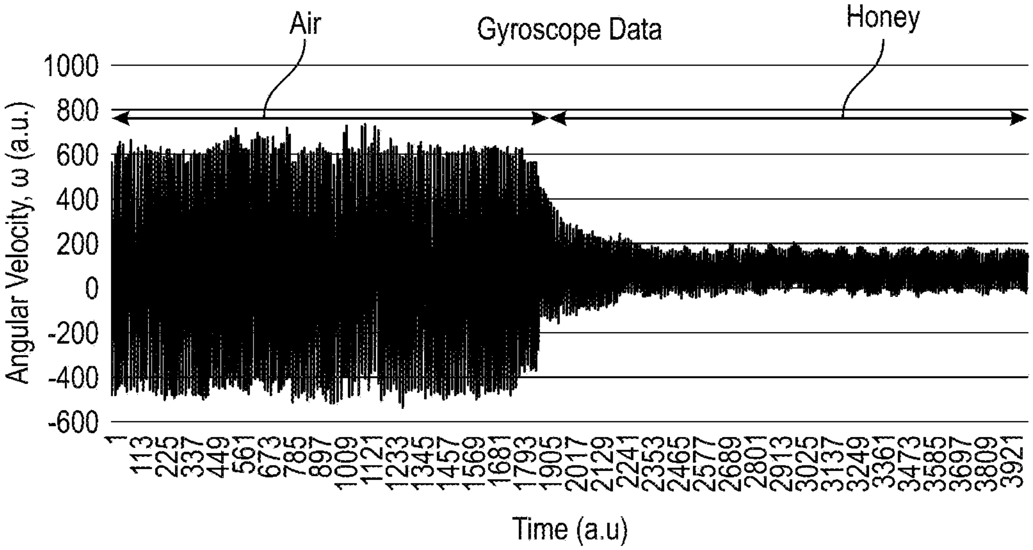
FIG. 17 shows a graph of the gyroscope output, or angular velocity, as measured about one of its orthogonal axes as the vibrating member is dipped in a volume of honey.

FIG. 17 shows a graph of the gyroscope output, or angular velocity, as measured about one of its orthogonal axes as the vibrating member is dipped in a volume of honey. The amplitude of the measured/sensed signal attenuates when the vibrating member of the device is dipped into a more viscous fluid, such as honey, as compared to the amplitude of member vibration in air.

Figure 18:
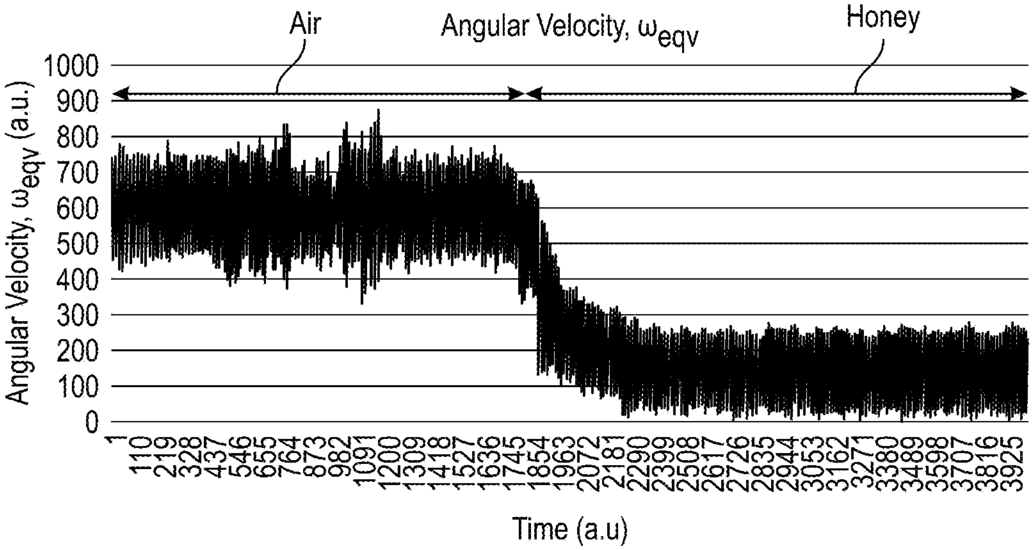
FIG. 18 shows the equivalent angular velocity which is computed as the square-root of the sum of squares of the angular velocity outputs of the gyroscope as measured about one or more of its orthogonal axes.

FIG. 18 shows the equivalent angular velocity which is computed as the square-root of the sum of squares of the angular velocity outputs of the gyroscope as measured about one or more of its orthogonal axes. This parameter provides supplementary data to corroborate changes in signals as the vibrating member moves from one medium to another.

Figure 19:
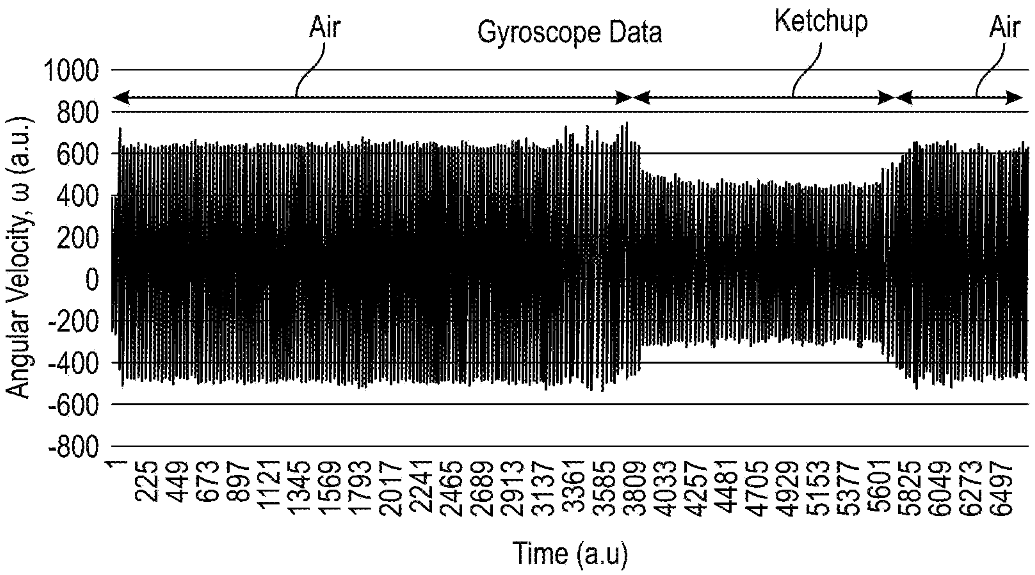
FIG. 19 shows the gyroscope output, or angular velocity, as measured about one of its orthogonal axes as the vibrating member is dipped and held in a volume of ketchup, before being removed back into air.

FIG. 19 shows the gyroscope output, or angular velocity, as measured about one of its orthogonal axes as the vibrating member is dipped and held in a volume of ketchup, before being removed back into air. The amplitude of the measured/sensed signal attenuates when the vibrating member of the device is dipped into ketchup as compared to the amplitude of member vibration in air. The attenuated signal then returns to its original amplitude in air as it is removed from the fluid, and as it continues vibrating in air.

Figure 20:
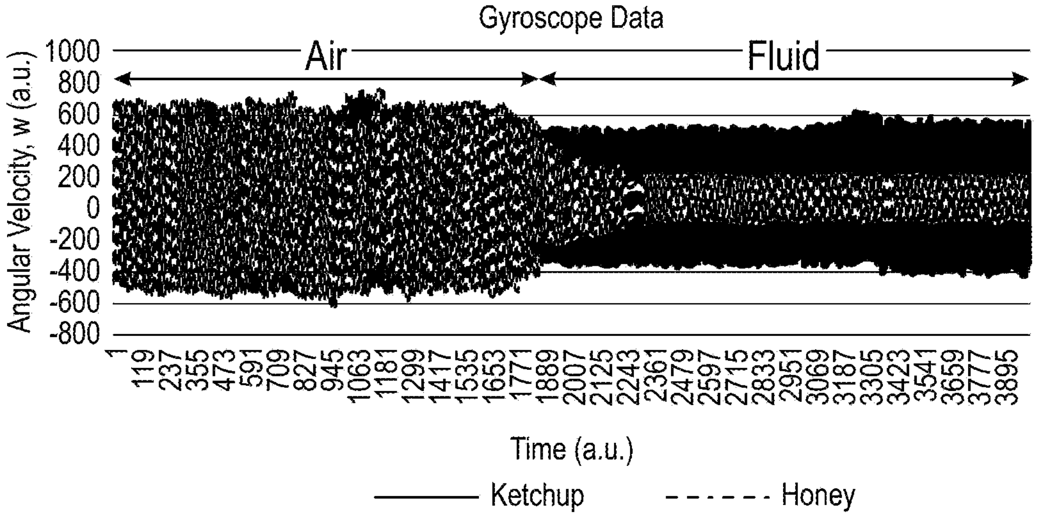
FIG. 20 compares the change in amplitude of the gyroscope output, or angular velocity, as measured about one of its orthogonal axes, for fluids with different viscosities, as the vibrating member is dipped and held in a volume of each fluid, honey and ketchup, separately.

FIG. 20 compares the change in amplitude of the gyroscope output, or angular velocity, as measured about one of its orthogonal axes, for fluids with different viscosities, as the vibrating member is dipped and held in a volume of each fluid, honey and ketchup, separately. Amplitude of the measured/sensed signal is attenuated to a significantly greater degree in honey (orange) than it is in ketchup (blue), thereby indicating the higher mechanical impedance that the vibrating member encounters when moving in honey as compared to that in ketchup The higher degree of signal amplitude attenuation in honey as compared to that in ketchup, in turn, indicates a higher viscosity and/or static viscosity for honey as compared to that for ketchup.

Figure 21:
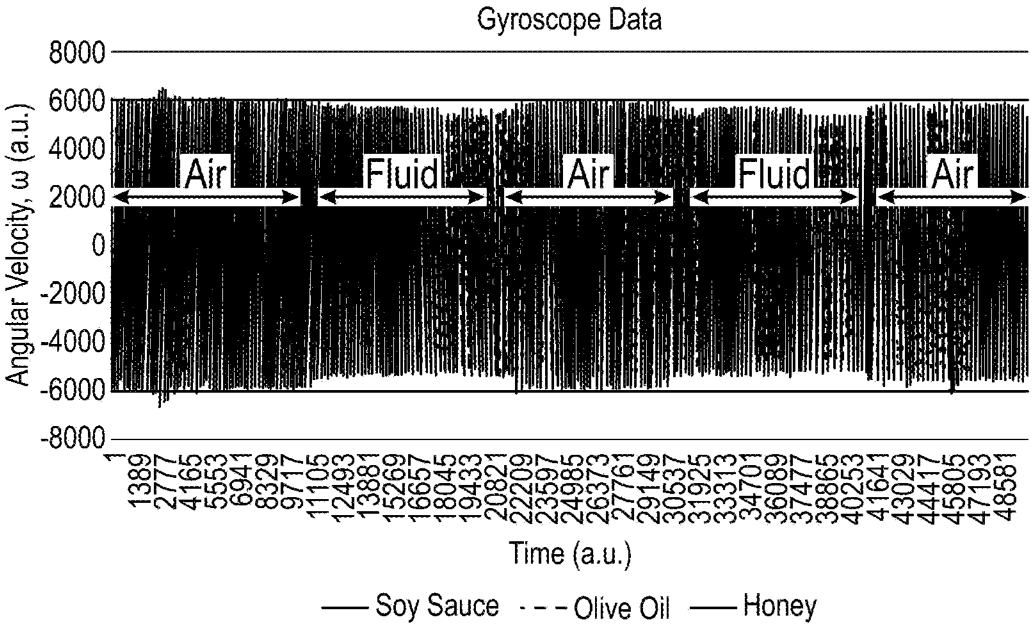
FIG. 21 compares the change in amplitude of the gyroscope output, or angular velocity, as measured about one of its orthogonal axes, for fluids with different viscosities, as the vibrating member is dipped and held and then undipped, repeatedly, into a volume of each fluid, honey, olive oil, and soy sauce, separately.

FIG. 21 compares the change in amplitude of the gyroscope output, or angular velocity, as measured about one of its orthogonal axes, for fluids with different viscosities, as the vibrating member is dipped and held and then undipped, repeatedly, into a volume of each fluid, honey, olive oil, and soy sauce, separately. The largest change in amplitude of the gyroscope output, relative to the signal amplitude in air, is observed for honey, which has the highest viscosity. This is followed by olive oil, and then, soy sauce, which is the least viscous of the three fluids.

Figure 22:
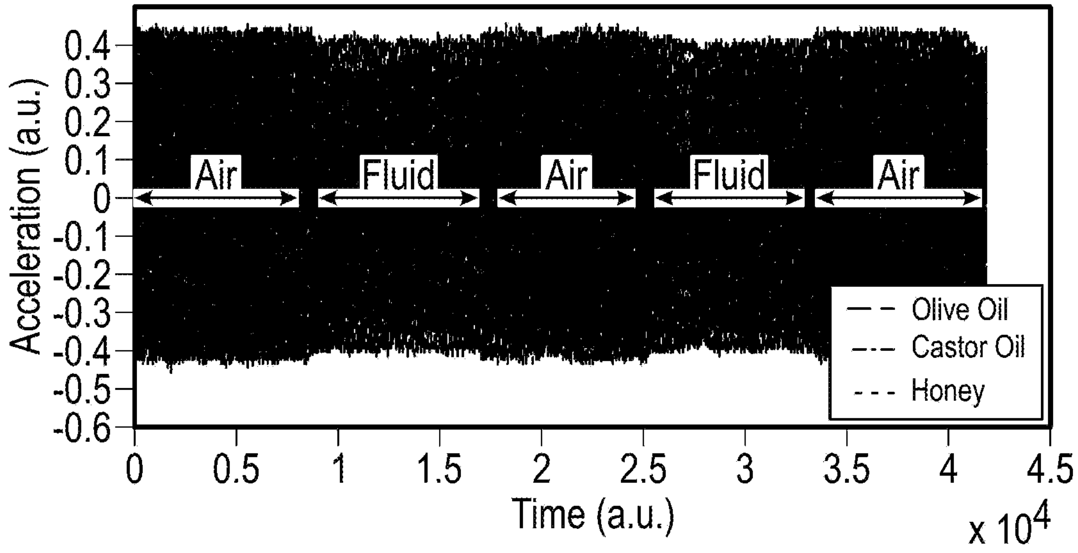
FIG. 22 compares the change in amplitude of the accelerometer output, or acceleration, as measured about one of its orthogonal axes, for fluids with of different viscosities, as the vibrating member is dipped and held and then undipped, repeatedly, into a volume of each fluid, honey, olive oil, and castor oil, separately.

FIG. 22 compares the change in amplitude of the accelerometer output, or acceleration, as measured about one of its orthogonal axes, for fluids with different viscosities, as the vibrating member is dipped and held and then undipped, repeatedly, into a volume of each fluid, honey, olive oil, and castor oil, separately. The largest change in amplitude of the accelerometer output, relative to the signal amplitude in air, is observed for honey, which has the highest viscosity. This is followed by castor oil, and then, olive oil, which is the least viscous of the three fluids.

Figure 23:
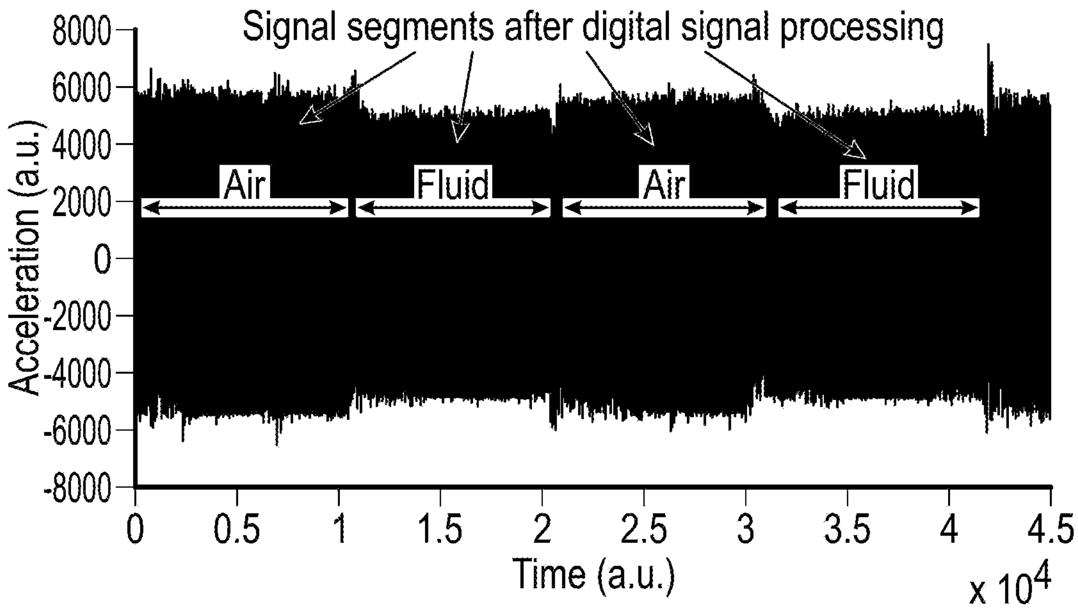
FIG. 23 shows the raw and unprocessed output of the accelerometer, or acceleration, as measured about one of its orthogonal axes, as the vibrating member is dipped and held and then undipped, repeatedly, into a volume of a fluid (blue plot)

FIG. 23 shows the raw and unprocessed output of the accelerometer, or acceleration, as measured about one of its orthogonal axes, as the vibrating member is dipped and held and then undipped, repeatedly, into a volume of a fluid (blue plot). Segments of this acceleration signal are then processed through digital bandpass filters to remove noise from various sources, including mechanical vibration noise due to the handheld operation of the apparatus. This noise, if not filtered, decreases the fidelity of the fluid viscosity measurement result. The corresponding bandpass filtered segments (green in air, and red in fluid) of the measured acceleration signal are overlaid on the raw and unprocessed acceleration signal measured (in blue) to highlight the efficacy of the signal processing techniques employed for reducing noise.

Figure 24:
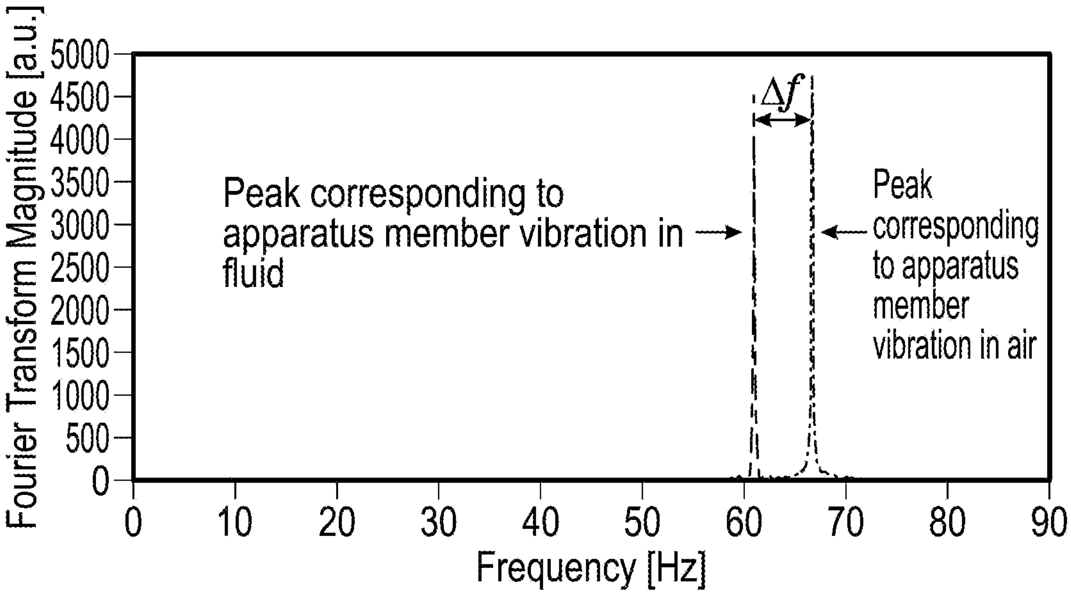
FIG. 24 illustrates the magnitude of the frequency-domain spectrum of the time-domain signal corresponding to the output of the angular rate sensor or the gyroscope along one of its orthogonal sense axes when the apparatus member is vibrating in air (black), and when the apparatus member is dipped and vibrating in a viscous fluid such as honey (red).

FIG. 24 illustrates the magnitude of the frequency-domain spectrum of the time-domain signal corresponding to the output of the angular rate sensor or the gyroscope along one of its orthogonal sense axes when the apparatus member is vibrating in air (black), and when the apparatus member is dipped and vibrating in a viscous fluid such as honey (red). The change in the vibration frequency of the apparatus member due to the viscosity or the static viscosity (product of the fluid viscosity and fluid density) of the fluid into which the member is dipped, is indicated by the shift in the frequency (or the center frequency) of the peak, $\Delta f$, in the signal spectrum. In an exemplary embodiment of the apparatus and the viscosity measurement method, the magnitude of this shift in the apparatus vibration frequency is correlated to the viscosity, or the static viscosity, or the shear-rate dependent viscosity, or one or more rheological properties, of the fluid into which the apparatus member is dipped.

In at least an embodiment, the apparatus comprises a temperature sensor integrated with or coupled to the member or to one or more fins/plates attached to the member. This temperature sensor can be a MEMS temperature sensor, a diode, a thermistor, a thermal sensor, an analog temperature sensor, or digital temperature sensor, an electronic temperature sensor, or a combination thereof. There can be one or more temperature sensors in a single apparatus as claimed in claim 1, integrated or coupled to the apparatus at different positions such as on the member, within the member, on the fin/plate, within the fin/plate, within the housing of the apparatus, or part of the member or the fin that is dipped into the fluid, or part of the member or the housing or the apparatus that is not dipped into the fluid.

The one or more Inertial Measurement Units, accelerometers, gyroscopes, sensors, temperature sensor/s of the apparatus could also communicate with, or be integrated with, or be capable of storing and/or sending their measured data or measurements to one or more circuits or integrated circuits or digital signal processing circuits or microprocessors or microcontrollers or programs or algorithms running on these microprocessor or microcontrollers or on a peripheral device such as a computer, a laptop, an electronic smart watch, a phone, a smart phone, a smart speaker, a cellular phone or device, a smart hearing device such as electronic earbud/s or headphone/s or hearing aid/s, or the cloud.

In an embodiment, the apparatus comprises optional integration of motorized mechanical stirring mechanism or an optional agitating base, attached to the member (12). Such a stirring or agitating mechanism enables the addition of either a predefined stress or shear or a combination thereof to the fluid under characterization. This also allows for the measurement of viscosity and/or other rheological and/or physical parameters of the fluid at a known shear rate or as required for rheological measurements of fluids such as but not limited to blood, plasma, thickeners in food, sealants, adhesives, creams, gels, and other additives or rheological modifiers.

Additionally, such a stirring or agitating mechanism enables real time measurement of viscosity and/or other rheological and/or physical parameters of the fluid as the fluid is being diluted or modified through the use of rheological modifiers.

In some embodiments, the apparatus comprises a display to enable readout of fluid viscosity and/or other rheological and/or physical parameters of the fluid.

In some embodiments, the device and its constituent actuators, motors, sensors, inertial measurement unit/s (IMUs) are powered electrically via a power source such as one or more batteries, button cells, electric cells and/or photovoltaic cells. These power sources are disposed on the device. One or more of these power sources can be replaceable and/or rechargeable.

Additionally, and optionally, the device and its constituent actuators, motors, sensors, inertial measurement unit/s (IMUs) are powered electrically via a wired connection to a portable power source such as a computer, or a laptop, or a tablet computer, or a smart phone (which can include the batteries powering such peripheral devices), and/or via wired connection to a wall outlet or any other non-portable power source.

Alternative embodiments of this device concept also enable the wireless and/or wired transmission of relevant measurement information to a remote device such as a cellphone, smart phone, computer, tablet computer, smart watch, smart hearing device or "hearable", earphones or earbuds, headphones, hearing aid, or a smart wearable electronic device, a smart speaker, an electronic database stored on a remote device such as a computer or server or "cloud" and/or an digital/electronic notebook or laboratory notebook.

Alternative embodiments of this device concept utilize algorithms aided or informed or based on/by machine learning and/or deep learning and/or artificial intelligence to fuse, integrate, assimilate, augment, the outputs/signals/data of the sensors and actuators that constitute the device described in this invention.

One or more of the sensor outputs can be used to compute, calculate or measure, one or more of the following properties of fluids such as density, viscosity, static viscosity, dynamic viscosity, kinematic viscosity, compressibility and or volume elasticity, thixotropic index, dispense rate, and sag resistance.

The TECHNICAL ADVANCEMENT of this invention lies in measuring/sensing/detecting/recording viscosity and/or one or more rheological properties of a fluid using a vibrating member along with coupled gyroscope measurements and/or accelerometer measurements. While prior art uses traditional motor feedback and control methods to maintain a constant amplitude of member's motion and senses the motor drive current and correlates that current to the fluid's viscosity and/or rheological property/rheological parameter that is being measured, the invention described herein does away with these limitations by using a vibrating member or element along with a coupled gyroscope (angular rate sensor) and/or an accelerometer. The use of miniaturized MEMS accelerometers and gyroscopes, in turn, reduces complexity of drive and sense electronics as compared to those in the prior art; thereby, enabling miniaturization and portability of these apparatus (viscometers) while significantly driving down manufacturing, assembly and maintenance complexity and cost.

It will be understood that, although the terms first, second, etc. may be used herein to describe various elements/members/signals, these elements/members/signals should not be limited to any order by these terms. These terms are used only to distinguish one element/member/signal from another; where there are "second" or higher ordinals, there merely must be that many number of elements, without necessarily any difference or other relationship. For example, a first element/member/signal could be termed a second element/member/signal, and, similarly, a second element/member/signal could be termed a first element/member/signal, without departing from the scope of example embodiments. As used herein, the term "and/or" includes all combinations of one or more of the associated listed items. The use of "etc." is defined as "et cetera" and indicates the inclusion of all other elements belonging to the same group of the preceding items, in any "and/or" combinations.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. An apparatus for measuring, viscosity or one or more rheological properties of fluids as a function of at least one signal, the apparatus comprising:

- a member with an Inertial Measurement Unit (IMU) coupled to the member, wherein the IMU is configured to measure the signal in relation to the member;
- fins attached to the member, wherein the fins project distally from the member and are configured to be vibrating or static; and
- a motor coupled to the member to make the member into a vibrating member upon actuation of the motor, wherein the member is configured to be dipped into a fluid whose viscosity or one or more rheological properties is to be measured.

2. The apparatus as claimed in claim 1, wherein the IMU includes at least one element from a group of elements consisting of:

- an accelerometer attached to said member and configured to measure acceleration about one or more orthogonal axes; and
- a gyroscope attached to the member and configured to measure angular velocity, angular displacement, and/or orientation about one or more orthogonal axes.

3. The apparatus as claimed in claim 1, wherein the IMU includes at least one element selected from a group of elements consisting of:

- a gyroscope;
- an angular rate sensor;
- a rate integrating gyroscope;
- an angular rate sensor based on the Coriolis effect;
- an accelerometer;
- a magnetometer;
- a pressure sensor;
- a barometer; and
- a temperature sensor.

4. The apparatus as claimed in claim 1, wherein the IMU is located at a point on the member at a distance from an operative distal end portion of the member, and wherein the operative distal end portion is configured to be dipped in fluid.

5. The apparatus as claimed in claim 1, further comprising:

- a plurality of the IMUs attached to the member, wherein each IMU is spaced apart from each other IMU.

6. The apparatus as claimed in claim 1, wherein the motor has an output with amplitude and/or frequency controlled by varying voltage or current applied to the motor.

7. The apparatus as claimed in claim 1, wherein one or more of the fins are vibrating fins configured to vibrate with one or more corresponding vibrating frequencies.

8. The apparatus as claimed in claim 7, wherein at least two of the fins are static fins attached to an outer housing covering a portion of the member, wherein the static fins are equidistant in opposite directions from one of the vibrating fins to establish an equal shear rate in the fluid on sides of the vibrating fin.

9. The apparatus as claimed in claim 7, wherein at least two of the fins are static fins attached to an outer housing covering a portion of the member, wherein the static fins are at different distances in opposite directions from one of the vibrating fins to establish two different shear rates in the fluid on sides of the vibrating fin.

10. The apparatus as claimed in claim 1, wherein the fins project co-axially, laterally, or radially with respect to the member.

11. The apparatus as claimed in claim 1, wherein at least two of the fins are static fins located laterally on sides of a vibrating fin such that the static fins have their largest face along a plane which is either parallel to, or within 45 degrees of angular displacement with respect to, the plane corresponding to the largest face of the vibrating fin.

12. The apparatus as claimed in claim 11, wherein the static fins include one or more temperature sensors.

13. The apparatus as claimed in claim 11, further comprising:

- a first collar ensconcing the member and allowing for attaching of the fins to the member; and
- a second collar ensconcing an outer housing covering a portion of the member and allowing for variably positioning the static fins around the vibrating fin.

14. The apparatus as claimed in claim 1, wherein the fins include one or more temperature sensors.

15. The apparatus as claimed in claim 1, further comprising:

a first collar ensconcing the member and allowing for attaching the fins to the member.

16. A method, for measuring viscosity or one or more rheological properties of fluids as a function of one or more signals, the method comprising:

vibrating a member with a motor coupled to the member, wherein the member is configured to be dipped into a fluid whose viscosity or one or more rheological properties is to be measured, wherein the member includes fins attached to the member, wherein the fins project distally from the member and are configured to be vibrating or static;

transducing motion of the fluid-dipped vibrating member, using at least an Inertial Measurement Unit (IMU) coupled to the member, into one or more signals, about one or more orthogonal axes of a sensor of the IMU; and determining viscosity or one or more rheological properties of the fluid as a function of said one or more signals.

17. A method as claimed in claim 16, wherein the one or more signals are selected from a group of signals consisting of:

a first signal correlative to amplitude of vibration of the vibrating member, the vibration being measured about one or more orthogonal axes of a sensor of the IMU;

a second signal correlative to frequency of vibration, of the vibrating member, the vibration being measured about one or more orthogonal axes of a sensor of the IMU;

a third signal correlative to change in amplitude of vibration, of the vibrating member, the vibration being measured about one or more orthogonal axes of a sensor of the IMU;

a fourth signal correlative to change in frequency of vibration, of the vibrating member, the vibration being measured about one or more orthogonal axes of a sensor of the IMU;

a fifth signal correlative to change in amplitude of acceleration, of the vibrating member, the vibration being measured about one or more orthogonal axes of one or more accelerometers of the IMU;

a sixth signal correlative to change in frequency of acceleration, of the vibrating member, the vibration being measured about one or more orthogonal axes of one or more accelerometers of the IMU;

a seventh signal correlative to change in amplitude of angular velocity, of the vibrating member, the vibration being measured about one or more orthogonal axes of one or more gyroscopes of the IMU;

an eighth signal correlative to change in frequency of angular velocity, of the vibrating member, the vibration being measured about one or more orthogonal axes of one or more gyroscopes of the IMU;

a ninth signal correlative to phase of a signal driving the motor;

a tenth signal correlative to voltage signal driving the motor;

an eleventh signal correlative to difference in phase between a signal driving the motor and the first signal;

a twelfth signal correlative to difference in phase between a signal driving the motor and the second signal;

a thirteenth signal correlative to difference in phase between a signal driving the motor and the third signal;

a fourteenth signal correlative to difference in phase between a signal driving the motor and the fourth signal;

a fifteenth signal correlative to temperature of the fluid;

a sixteenth signal correlative to pressure of the fluid;

a seventeenth signal correlative to current flowing through the motor, as measured using a current sensor or a current sensing integrated circuit or an electronic circuit;

an eighteenth signal correlative to ambient temperature;

a nineteenth signal correlative to change in frequency of one or more peaks present in a frequency-domain spectrum of a time-domain angular velocity signal, of the vibrating member, the vibration being measured about one or more orthogonal axes of one or more gyroscopes of the IMU; and a twentieth signal correlative to change in frequency of one or more peaks present in a frequency-domain spectrum of a time-domain acceleration signal, of the vibrating member, the vibration being measured about one or more orthogonal axes of one or more accelerometers of the IMU.

18. A method as claimed in claim 16 wherein, the step of 'determining viscosity or one or more rheological properties' comprising the steps of:

sensing amplitude of vibration, of the vibrating member in air, along one or more orthogonal axes of a sensor of the IMU;

sensing frequency of vibration, of the vibrating member in air, along one or more orthogonal axes of a sensor of the IMU;

dipping the vibrating member into a fluid medium;

measuring change in amplitude of vibration once the vibrating member is dipped into the fluid medium to obtain a first signal;

measuring change in frequency of vibration once the vibrating member is dipped into the fluid medium to obtain a second signal;

measuring a third signal which is a phase or a difference in phase between a signal driving a motor, and the first signal and/or the second signal; and using the first signal and/or the second signal, or a combination thereof with the third signal, to compute viscosity or one or more rheological properties of the fluid medium.

19. A method as claimed in claim 16 wherein, the at least one signal is that of an acceleration signal, a velocity signal, a displacement signal, an angular velocity signal, an angular acceleration signal, an angular displacement signal, and/or a combination of these signals; where the acceleration signal is measured about one or more orthogonal axes of the accelerometer, and where the angular velocity signal and/or the angular acceleration signal and/or the angular displacement signal is measured about one or more orthogonal axes of an angular rate sensor or a gyroscope or a rate-integrating gyroscope.

20. The method as claimed in claim 16, wherein the determining viscosity or one or more rheological properties includes determining a shear rate of the fluid via the fins, wherein the fins include vibrating fins attached to the member and static fins attached to an outer housing covering a portion of the member, wherein the vibrating fins are configured to vibrate with one or more corresponding vibrating frequencies equal to or distinct from each other.

21. The method as claimed in claim 16, wherein the determining viscosity or one or more rheological properties includes determining a shear rate of the fluid via the fins wherein the fins include two static fins attached to an outer housing covering a portion of the member, wherein the two static fins are positioned equidistant in opposite directions from a vibrating fin to establish an equal shear rate in the fluid on different sides of the vibrating fin.

22. The method as claimed in claim 16, wherein the determining viscosity or one or more rheological properties includes determining a shear rate of the fluid via the fins, wherein the fins include two static fins attached to an outer housing covering a portion of the member, wherein the two static fins are positioned at different distances from an operative central vibrating fin to establish two different shear rates in the fluid on different sides of the operative central vibrating fin.

* * * * *